United States Patent
Fujita et al.

(10) Patent No.: US 11,946,860 B2
(45) Date of Patent: Apr. 2, 2024

(54) ELECTRONIC DEVICE

(71) Applicants: Tetsumaru Fujita, Hyogo (JP); Hidetaka Noguchi, Hyogo (JP)

(72) Inventors: Tetsumaru Fujita, Hyogo (JP); Hidetaka Noguchi, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/944,205

(22) Filed: Sep. 14, 2022

(65) Prior Publication Data
US 2023/0116586 A1 Apr. 13, 2023

(30) Foreign Application Priority Data

Sep. 22, 2021 (JP) .................. 2021-154499

(51) Int. Cl.
*G01N 21/25* (2006.01)
*G01N 21/27* (2006.01)

(52) U.S. Cl.
CPC ........... *G01N 21/255* (2013.01); *G01N 21/27* (2013.01); *G01N 2201/022* (2013.01)

(58) Field of Classification Search
CPC .................. G01N 21/255; G01N 21/27; G01N 2201/022; G01J 2003/064; G01J 3/021; G01J 3/0272; G01J 3/0291
See application file for complete search history.

(56) References Cited

U.S. PATENT DOCUMENTS

| | | | |
|---|---|---|---|
| 5,623,390 A * | 4/1997 | Noda | H01M 50/394 429/57 |
| 8,403,136 B1 | 3/2013 | Tsai | |
| 10,444,073 B1 | 10/2019 | Noguchi et al. | |
| 2009/0237647 A1 | 9/2009 | Azimi et al. | |
| 2011/0309247 A1* | 12/2011 | Azimi | G01J 3/0264 250/339.01 |
| 2012/0037524 A1 | 2/2012 | Lonsdale, II et al. | |
| 2014/0185210 A1* | 7/2014 | Iwamoto | G06F 1/1656 361/679.02 |
| 2019/0389231 A1 | 12/2019 | Yuki et al. | |

FOREIGN PATENT DOCUMENTS

| | | |
|---|---|---|
| JP | H07-168647 A | 7/1995 |
| JP | 2012-209353 | 10/2012 |
| JP | 2017-038820 | 2/2017 |
| JP | 2020-001216 | 1/2020 |
| WO | 2015/138028 A2 | 9/2015 |

OTHER PUBLICATIONS

Extended European Search Report dated Feb. 2, 2023 in European Patent Application No. 22196089.1, 8 pages.

* cited by examiner

*Primary Examiner* — Tarifur R Chowdhury
*Assistant Examiner* — Carlos Perez-Guzman
(74) *Attorney, Agent, or Firm* — XSENSUS LLP

(57) ABSTRACT

An electronic device includes a housing that houses a movable member inside the housing, and a shock absorbing member that reduces a shock to the movable member. The shock absorbing member holds the housing on an inner side of the shock absorbing member and includes at least one of a protrusion protruding in a direction along a movable direction of the movable member or a depression depressed in a direction along the movable direction on an outer side of the shock absorbing member.

12 Claims, 14 Drawing Sheets

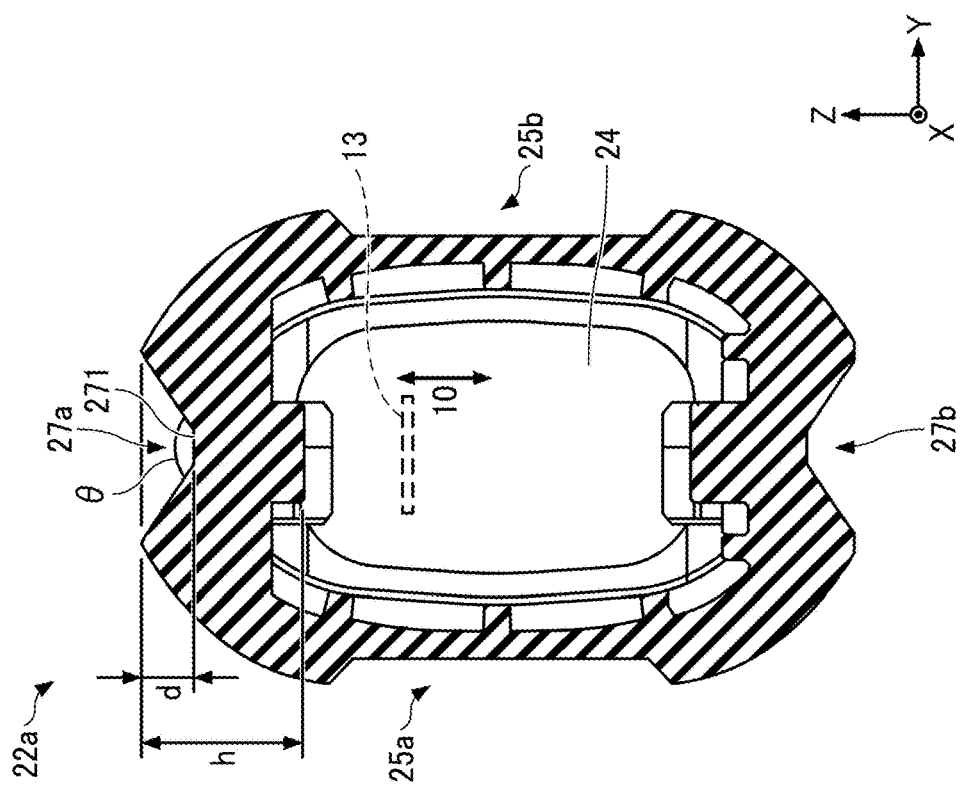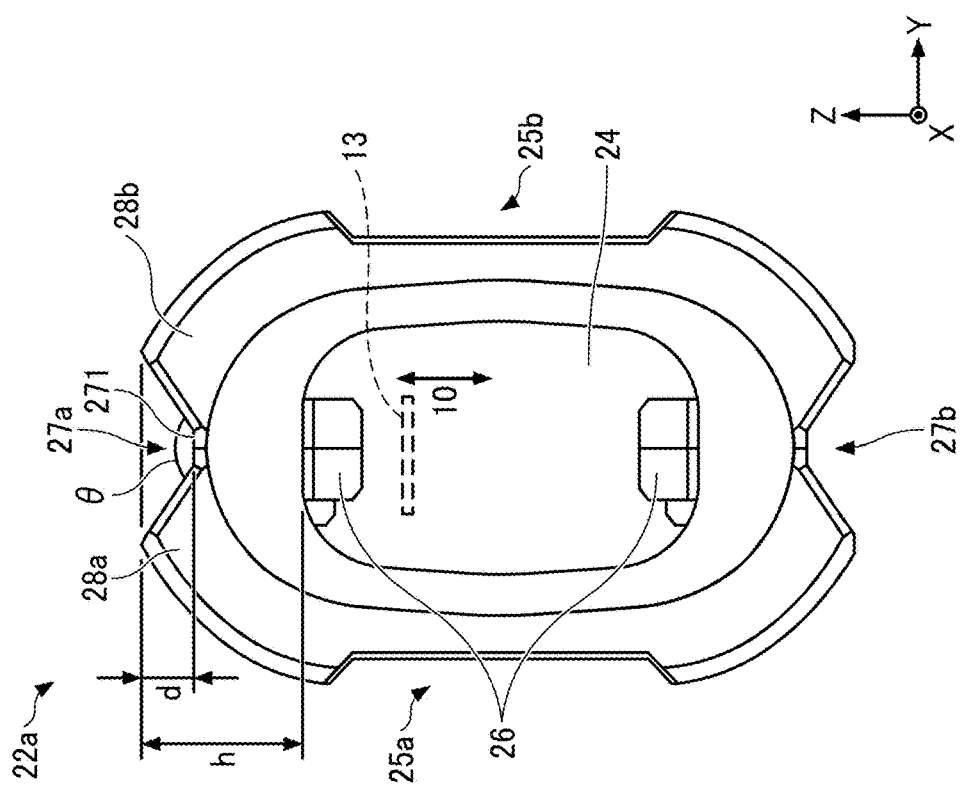

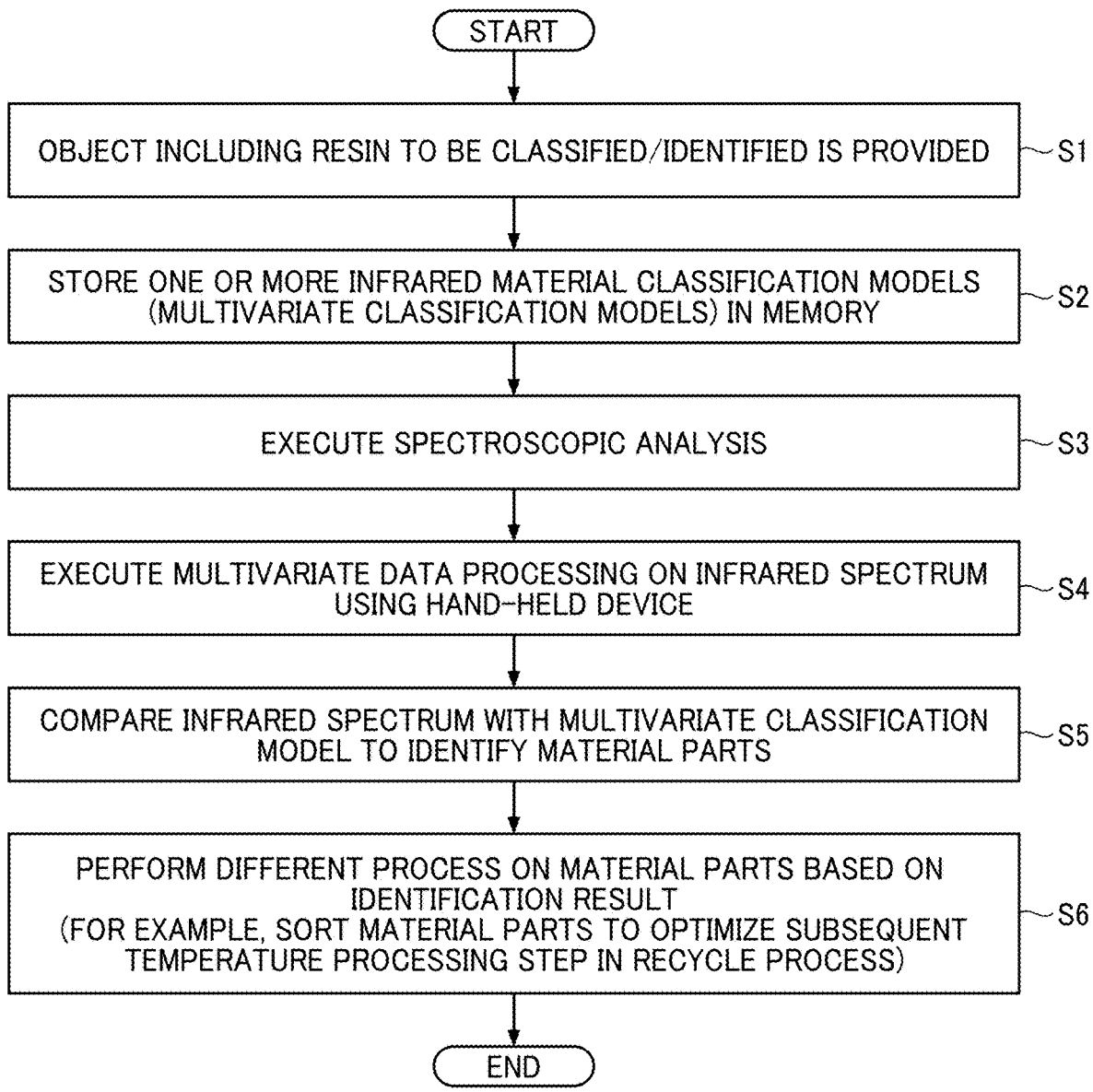

ELECTRONIC DEVICE

CROSS-REFERENCE TO RELATED APPLICATIONS

This patent application is based on and claims priority pursuant to 35 U.S.C. § 119(a) to Japanese Patent Application No. 2021-154499, filed on Sep. 22, 2021, in the Japan Patent Office, the entire disclosure of which is hereby incorporated by reference herein.

BACKGROUND

Technical Field

The present disclosure relates to an electronic device.

Related Art

An electronic device of related art including a movable member such as a micro electro mechanical systems (MEMS) mirror is known. Examples of such an electronic device include a spectroscope that spectroscopically analyzes light from an object. For example, a spectroscope is used to identify the type of resin or the like of an object by spectroscopic analysis, and to sort and recover the object for each type of resin as a recycled material.

There is also an electronic device including a plurality of end protection members. The plurality of end protection members cover end portions of the electronic device at at least two positions to protect the electronic device from a shock that is applied to the electronic device from the outside.

SUMMARY

Example embodiments of the present disclosure include an electronic device including a housing that houses a movable member inside the housing, and a shock absorbing member that reduces a shock to the movable member. The shock absorbing member holds the housing on an inner side of the shock absorbing member and includes at least one of a protrusion protruding in a direction along a movable direction of the movable member or a depression depressed in a direction along the movable direction on an outer side of the shock absorbing member.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a side view illustrating the first example of the configuration of the shock absorbing member in the spectroscope in FIG. 1;

FIG. 9 is a cross-sectional view taken through line VI-VI in FIG. 6;

FIG. 21 is a flowchart presenting an operation of the spectroscopic system in FIG. 21.

Figure 1:
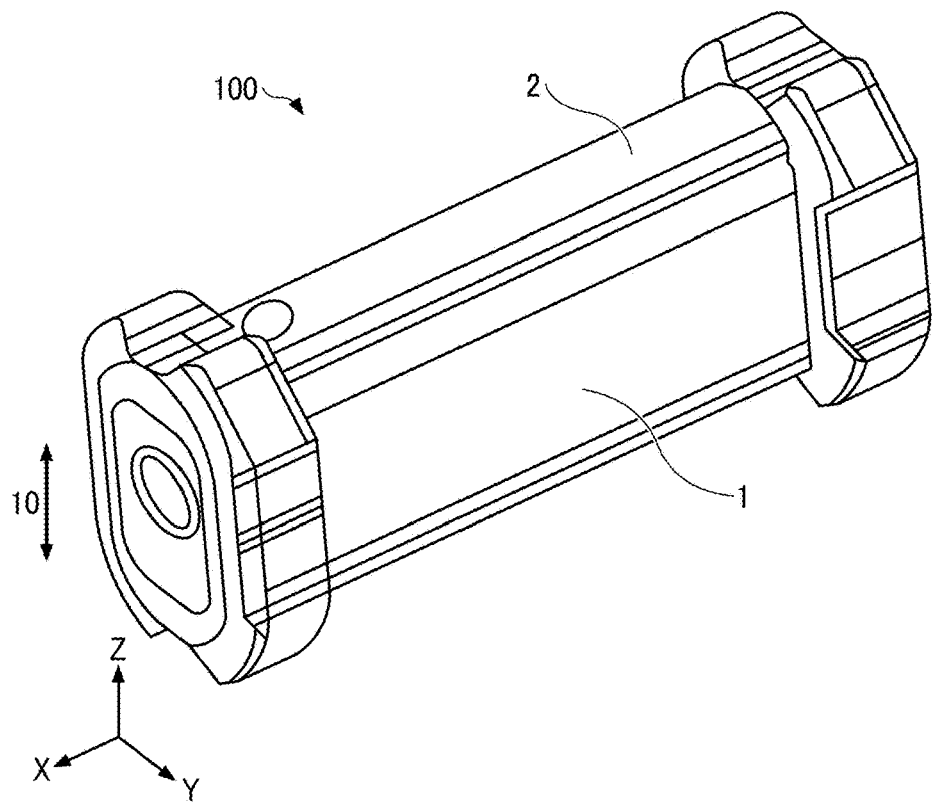
FIG. 1 is a perspective view illustrating a general arrangement of a spectroscope according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Referring now to the drawings, embodiments of the present disclosure are described below. As used herein, the singular forms "a," "an," and "the" are intended to include the plural forms as well, unless the context clearly indicates otherwise.

Embodiments for implementing the present disclosure are described below in detail referring to the drawings. Like reference signs are applied to identical components or corresponding components throughout the drawings and redundant description thereof is omitted.

While the directions may be indicated by an X-axis, a Y-axis, and a Z-axis in the drawings described below, it is assumed that an X direction along the X-axis indicates a direction substantially orthogonal to a swing axis of a movable member included in a spectroscope according to an embodiment, and a Y direction along the Y-axis indicates a direction along the swing axis. A Z direction along the Z-axis is a direction substantially orthogonal to both the X direction and the Y direction, and is a direction along a movable direction of the movable member.

A direction in which an arrow faces in the X direction is referred to as a +X direction or a +X side, a direction opposite to the +X direction is referred to as a −X direction or a −X side, a direction in which an arrow faces in the Y direction is referred to as a +Y direction or a +Y side, and a direction opposite to the +Y direction is referred to as a −Y direction or a −Y side. A direction in which an arrow faces in the Z direction is referred to as a +Z direction or a +Z side, and a direction opposite to the +Z direction is referred to as a −Z direction or a −Z side. For example, a spectroscope according to an embodiment emits light in the +X direction. However, the light emitting direction of the spectroscope does not limit the orientation of the spectroscope during use, and the direction of the spectroscope is any direction. Hereinafter, a spectroscope that incorporates a movable member and spectroscopically analyzes light from an object according to an embodiment will be described as an example of an electronic device.

First Embodiment

General Arrangement Example of Spectroscope 100

FIG. 1 is a perspective view illustrating a general arrangement of a spectroscope 100 according to a first embodiment. The spectroscope 100 is a handy electronic device that is small and portable when a user of the spectroscope 100 grips the electronic device with his/her hand or when the user houses the electronic device in a pocket of clothing, a bag, or the like. As illustrated in FIG. 1, the spectroscope 100 includes a housing 1 and a shock absorbing member 2.

The spectroscope 100 emits light from a light source in the housing 1 to an object, and spectroscopically analyzes reflected light reflected by the object of the emitted light. The spectroscopic analysis refers to examining a spectrum of light radiated or absorbed by a substance to specify or identify a component of the substance.

Examples of the object include a member including a resin as a material, fruits and vegetables, grains, meats, fishes, medicine tablets, and concrete. The spectroscope 100 is used to identify the type of resin or the like of the object by the spectroscopic analysis, and to sort and recover the object for each type of resin as a recycled material.

The housing 1 is a box-shaped member that houses the light source, a movable member, and so forth inside the housing 1. The movable member swings around the swing axis along the Y-axis inside the housing 1. A movable direction 10 along the Z-axis indicates a direction in which the movable member is movable by swinging. In the present embodiment, the housing 1 that is the box-shaped member having a quadrangular prism shape is exemplarily described; however, the housing 1 is not limited thereto. The housing 1 may have any shape, such as a cylindrical shape, an elliptic cylindrical shape, or a polygonal cylindrical shape, as long as the housing 1 can house the movable member inside the housing 1.

The shock absorbing member 2 is a member that reduces a shock to a movable member 13. The shock absorbing member 2 includes a material having elasticity such as rubber, and is provided to cover the housing 1 in a manner attachable to and detachable from the housing 1. However, the shock absorbing member 2 is not necessarily be attachable and detachable, and may be secured to the housing 1.

When the spectroscope 100 is dropped onto the ground or collides with a wall or the like while the spectroscope 100 is being carried or used, a shock is applied to the spectroscope 100, and the spectroscope 100 may be broken. In particular, a movable member incorporated in the housing 1 is likely to be broken due to a shock. The shock absorbing member 2 reduces a shock applied to the spectroscope 100 using elasticity to reduce the shock, and hence suppresses breakage of the spectroscope 100, in particular, the movable member included in the spectroscope 100.

When the spectroscope 100 collides with the ground or the like, an end portion or a corner portion of the spectroscope 100 is likely to collide first. Thus, it is desirable to provide the shock absorbing member 2 at the housing 1 to mainly cover end portions and corner portions of the housing 1 in the X direction and the Z direction.

Figure 2:
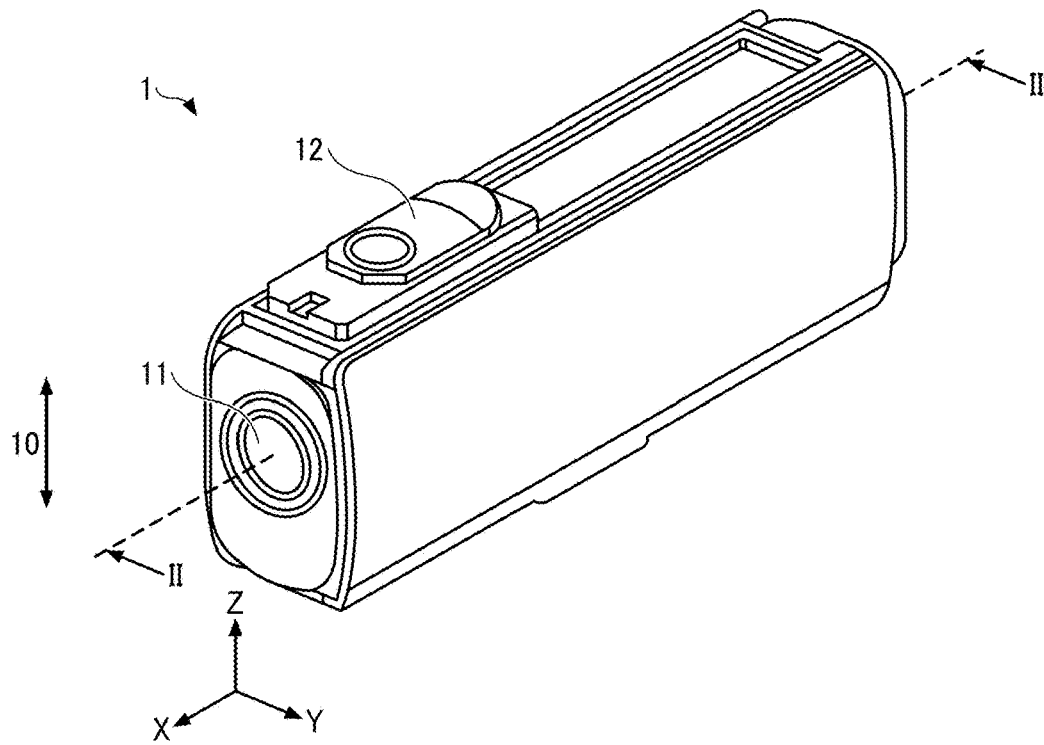
FIG. 2 is a perspective view illustrating a housing in the spectroscope in FIG. 1.

FIG. 2 is a perspective view illustrating the housing 1. FIG. 2 illustrates a state in which the shock absorbing member 2 is removed from the spectroscope 100. The housing 1 has a window 11 provided on the +X side of the housing 1, and a switch 12 provided on the +Z side of the housing 1.

The window 11 is a window through which light from the light source in the housing 1 is emitted to the outside of the housing 1, and through which light emitted from the spectroscope 100 and reflected by an object 108 is incident on the inside of the housing 1. The window 11 includes glass, resin, or the like having a transparency for the light emitted by the light source. The transparency in this case represents having a transmissivity of 60% or more for the light emitted by the light source.

The switch 12 is a switch that switches the power supply of the spectroscope 100 on or off.

The switch 12 switches on or off the power supply in response to an operation by a user of sliding the switch 12 in the X direction. However, the switch 12 is not limited to the slide type, and any of various types, such as a push button type, may be applied.

The shock absorbing member 2 has openings at positions at which at least the window 11 and the switch 12 are disposed in a state in which the shock absorbing member 2 is attached to the housing 1. The window 11 can allow light to be incident or to be emitted, and the switch 12 can accept an operation by the user through the openings.

Internal Configuration Example of Housing 1

Figure 3:
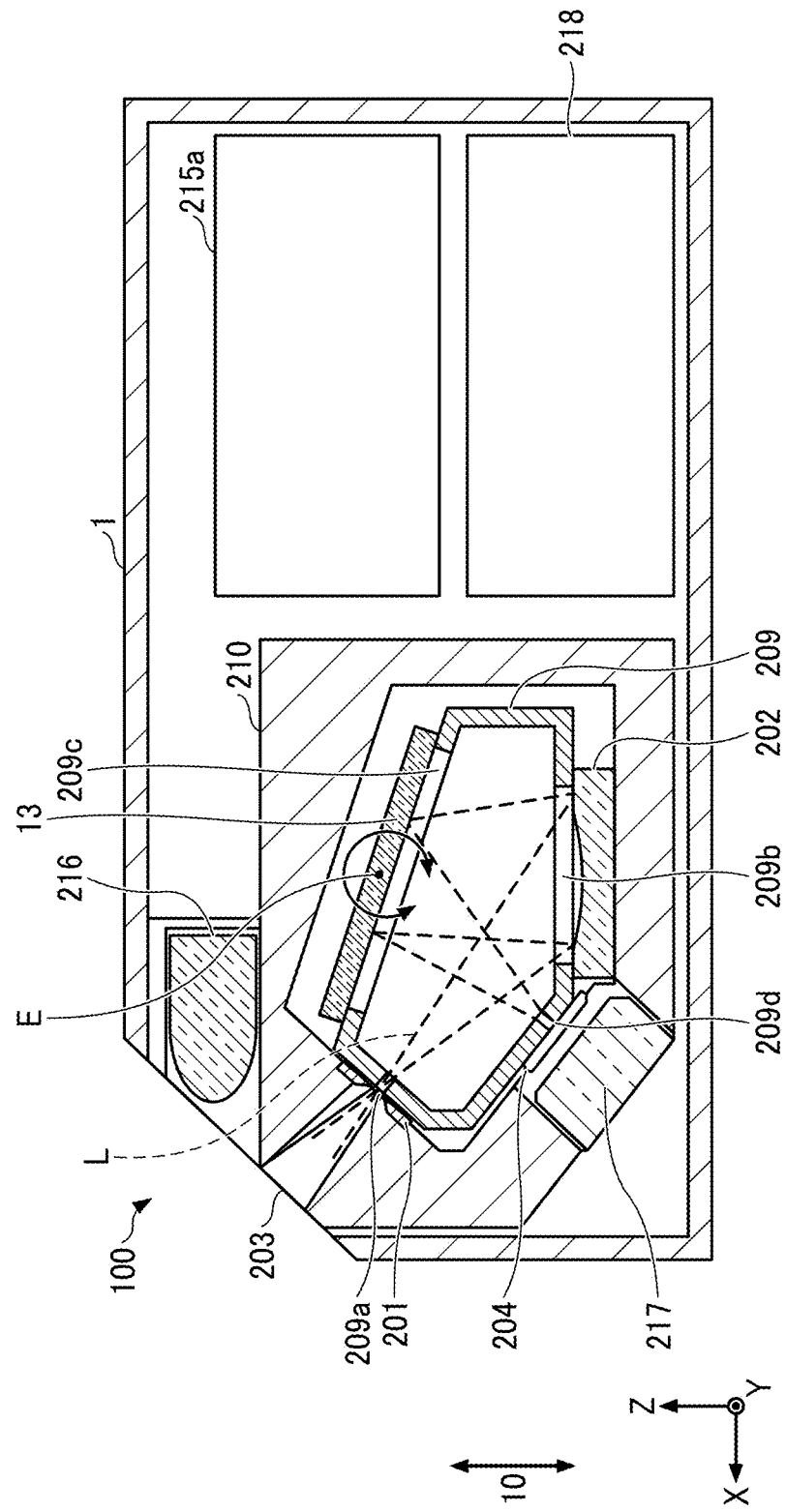
FIG. 3 is a cross-sectional view taken through line II-II in FIG. 2.
Figure 4:
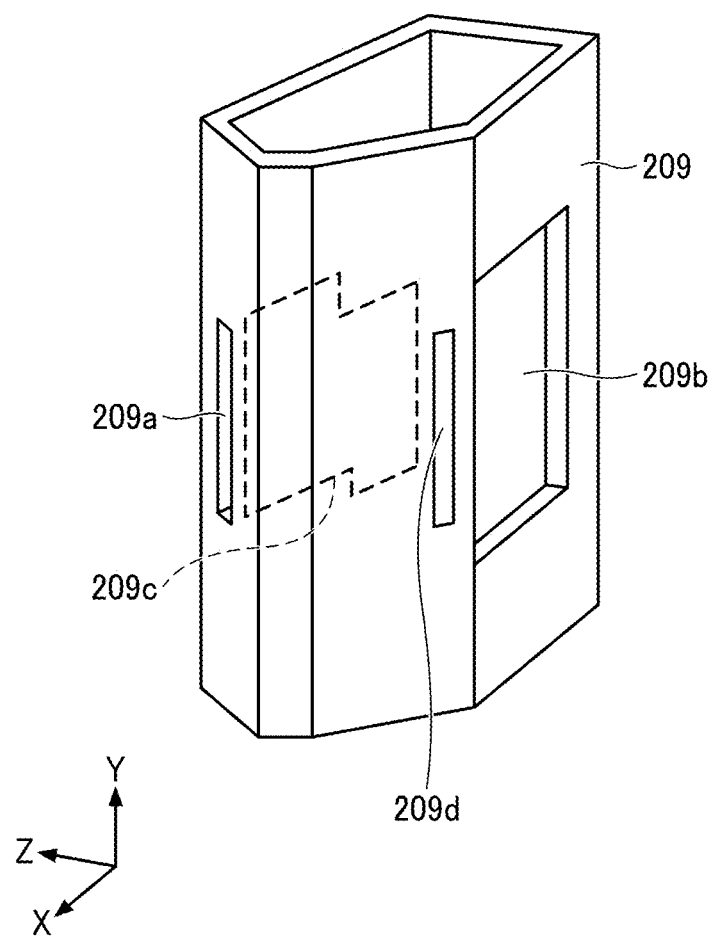
FIG. 4 is a perspective view illustrating a configuration of a frame in the spectroscope in FIG. 1.

FIG. 3 is a cross-sectional view taken through line II-II in FIG. 2. FIG. 4 is a perspective view illustrating a configuration of a frame 209 in the spectroscope 100.

As illustrated in FIG. 3, the spectroscope 100 includes a light source 216, a concave diffraction grating 202, a movable member 13, and a light receiver 217. The spectroscope 100 also includes the frame 209, a processor 215a, and a battery 218. The spectroscope 100 houses these components inside the housing 1.

The light source 216 emits light to an object to be subjected to spectroscopic analysis. The light source 216 is, for example, a light emitting diode (LED) or a halogen lamp. The light source 216 that emits light with a proper wavelength band for the object of the spectroscopic analysis is selected, and is disposed on the outer side of an outer frame 210.

The concave diffraction grating 202 is an example of a diffraction portion that diffracts light emitted from the light source 216 and reflected by the object. The concave diffraction grating 202 is an optical element in which thin lines are formed at equal intervals on a surface of a metal concave mirror. However, the material of the base material of the concave diffraction grating 202 is not limited to metal, and may be semiconductor, glass, resin, or the like. When a material such as semiconductor, glass, or resin is used, it is desirable to form a reflecting mirror film on surfaces of the thin lines.

The thin lines of the concave diffraction grating 202 may be directly formed on the base material, or may be formed in a thin layer of resin or the like formed on the base material. The concave diffraction grating 202 has both a light dispersion function by the diffraction grating and a light focusing function by the concave mirror. The light incident on the concave diffraction grating 202 is diffracted and dispersed by the concave diffraction grating 202, and is focused toward the movable member 13. The dispersion of light represents a phenomenon in which incident light is separated on a wavelength basis.

The movable member 13 is, for example, a MEMS mirror in which a mirror portion is integrally formed with an elastic beam portion serving as a coupling portion on a substrate. The mirror portion reflects light incident on the mirror portion. The mirror portion swings in a direction indicated by an arrow around a swing axis E by elastic movement of the elastic beam portion. Due to swinging around the swing axis E, both end portions of the mirror portion in the movable member 13 in the X-axis direction reciprocate in the movable direction 10 along the Z direction.

Although the mirror portion of the movable member 13 performs an operation including a curvature by swinging, strictly speaking, both end portions of the mirror portion in the X-axis direction reciprocate to substantially linearly move in the movable direction 10. The movable direction 10 includes a movement direction in which such a mirror portion substantially linearly moves.

In FIG. 3, the movable member 13 is slightly inclined with respect to the X-axis: however, the movable member 13 may be provided substantially in parallel to the X-axis. In the present embodiment, the movable direction 10 is a movement direction in which both end portions of the mirror portion substantially linearly move in a state in which the movable member 13 is inclined with respect to the X-axis as illustrated in FIG. 3.

While the movable member 13 that swings is exemplarily described in the present embodiment, the movable member 13 is not limited thereto. For example, the operation of the movable member includes an operation such as swinging, vibration, rotation, linear movement, precession, or translation. The movable direction 10 includes a direction in which the movable member 13 moves in accordance with the operation.

The movable member 13 swings the mirror portion to change the reflection angle of the incident light. The movable member 13 reflects the light toward the light receiver 217 using, for example, the mirror portion to guide the light diffracted by the concave diffraction grating 202 to the light receiver 217.

The light receiver 217 is a photoelectric conversion element, such as a photodiode. The light receiver 217 outputs an electric signal corresponding to the light intensity of the light diffracted by the concave diffraction grating 202.

The processor 215a performs computation to acquire a spectroscopic spectrum based on the electric signal input from the light receiver 217. The spectroscopic spectrum represents an intensity distribution of reflected light reflected by an object on a wavelength basis. The spectroscope 100 can perform spectroscopic analysis based on the spectroscopic spectrum.

The processor 215a controls the movable member 13 to emit light with a predetermined wavelength toward the light receiver, and further controls the emission of light by the light source 216, for example, the intensity of light.

The battery 218 supplies power to drive the components included in the spectroscope 100, such as the light source 216, the movable member 13, and the processor 215a. A battery, a secondary battery (storage battery), or the like may be applied to the battery 218. In one example, power may be supplied from a commercial power supply to the spectroscope 100 instead of the battery 218 or together with the battery 218.

As illustrated in FIG. 4, the frame 209 is a prism having a polygonal cross section and a hollow structure with the inside being hollow. The material of the frame 209 is, for example, resin, metal, or ceramic, and is not particularly limited. The frame 209 includes an incidence slit 201 and an emission slit 204. The frame 209 has rectangular openings 209a to 209d that allow the outside of the frame 209 and the hollow portion inside the frame 209 to communicate with each other at predetermined positions of surfaces included in the frame 209.

As illustrated in FIGS. 3 and 4, the concave diffraction grating 202 is disposed at the position of the opening 209b in the frame 209, and is secured to a surface on the outer side of the frame 209. Light incident from the opening 209a passes through the opening 209b and is incident on the concave diffraction grating 202 disposed on the outer side of the frame 209. The light incident on the concave diffraction grating 202 is diffracted and dispersed by the concave diffraction grating 202, and propagates while being focused toward the opening 209c.

The movable member 13 is disposed at the position of the opening 209c and is secured to a surface on the outer side of the frame 209. The dispersed light by the concave diffraction grating 202 passes through the opening 209c and is incident on the movable member 13 disposed on the outer side of the frame 209. The light incident on the mirror portion of the movable member 13 is reflected by the mirror portion and propagates toward the opening 209d.

The mirror portion of the movable member 13 swings around the swing axis E; however, the mirror portion swings in a region included in the opening 209c of the frame 209, and hence the mirror portion does not come into contact with the frame 209 during the swinging.

A ray L indicated by broken lines in FIG. 3 represents a portion of a ray that is incident on the frame 209, is diffracted by the concave diffraction grating 202, is reflected by the mirror portion of the movable member 13, and then reaches the light receiver 217.

The incidence slit 201 is a narrow and substantially rectangular opening, and allows the light incident from a tapered hole 203 of the outer frame 210 to be incident in the frame 209. The longitudinal direction of the opening of the incidence slit 201 corresponds to the X direction, and the transverse direction of the opening of the incidence slit 201 corresponds to a direction substantially orthogonal to the X direction.

The width of the opening in the transverse direction of the incidence slit 201 is, for example, several tens of micrometers to several hundreds of micrometers. The incidence slit 201 is formed by providing a rectangular through hole in a metal substrate made of nickel or the like.

However, the material of the substrate in which the incidence slit 201 is formed is not limited to metal, and may be semiconductor, resin, or the like. The incidence slit 201 is not limited to the rectangular opening, and may be a pinhole or the like having a circular opening. The light incident from the incidence slit 201 into the frame 209 is incident on the concave diffraction grating 202.

The emission slit 204 is a narrow and substantially rectangular opening that allows the dispersed light to be emitted from the frame 209. The material and shape of the emission slit 204 may be the same as the material and shape of the incidence slit 201.

The emission slit 204 is disposed at a position at which the light dispersed by the concave diffraction grating 202 is substantially focused. The focus position of the light dispersed by the concave diffraction grating 202 is laterally deviated (shifted) in accordance with the wavelength. The spectroscope 100 changes the reflection angle of the light dispersed by the concave diffraction grating 202 by the mirror portion of the movable member 13 to change the wavelength of the light passing through the emission slit 204, thereby selectively guiding light with a predetermined wavelength among the dispersed light to the light receiver 217.

Configuration Example of Movable Member 13

Figure 5:
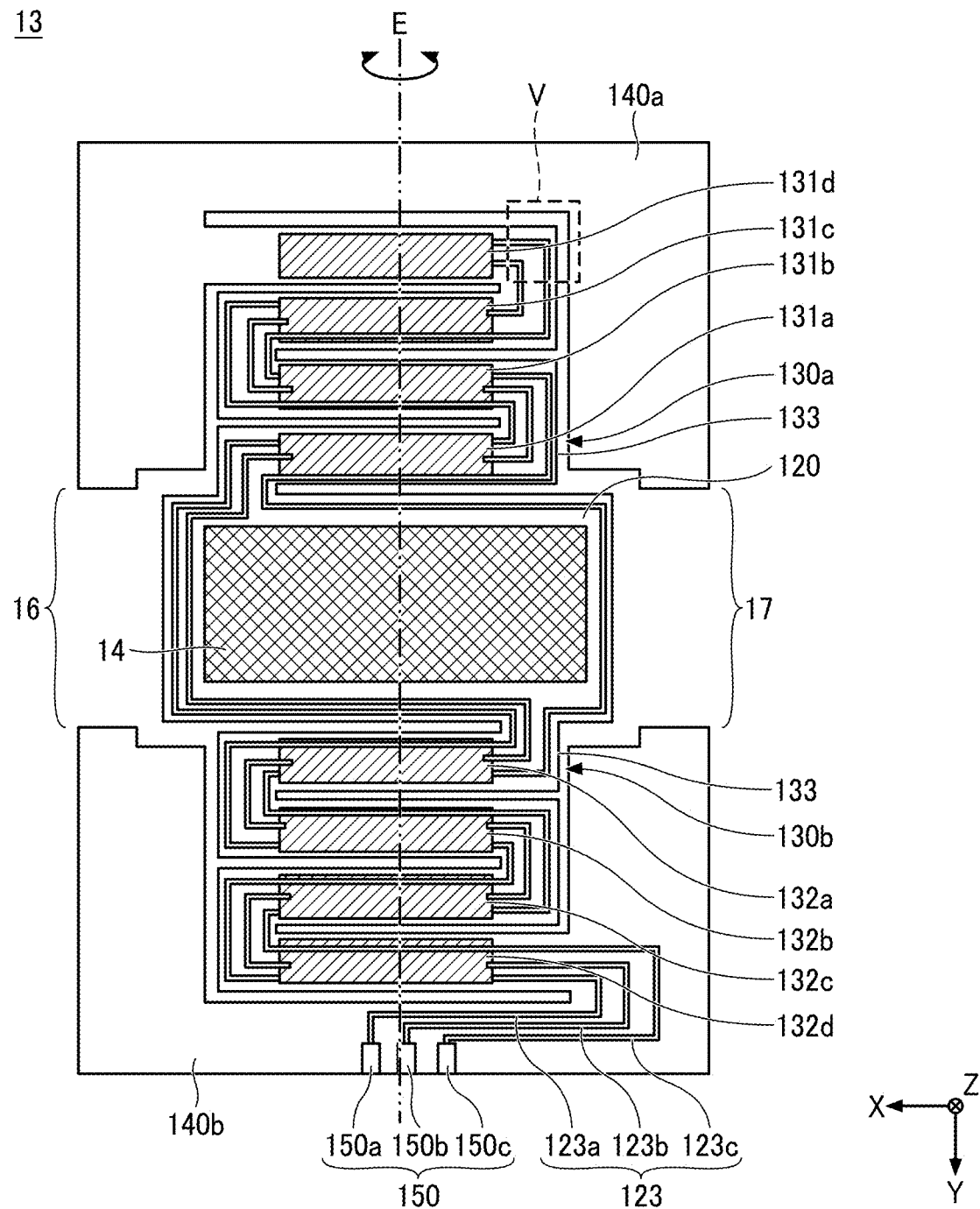
FIG. 5 is a plan view illustrating a configuration of a movable member in the spectroscope in FIG. 1.

FIG. 5 is a plan view illustrating a configuration of the movable member 13. The movable member 13 is a both-end support beam MEMS mirror. The movable member 13 swings a mirror portion 120 around the swing axis E parallel to the Y-axis to deflect the light incident on a mirror surface 14 provided on the mirror portion 120 around the swing axis E. Deflection refers to changing the direction of light.

As illustrated in FIG. 5, the movable member 13 includes the mirror portion 120, drive beams 130a and 130b, and support portions 140a and 140b.

The mirror portion 120 is a plate-shaped portion that is formed in a substantially rectangular shape in plan view and is swingable around the swing axis E. An end portion on the −X side of the mirror portion 120 is coupled to the drive beam 130a, and an end portion on the +X side of the mirror portion 120 is coupled to the drive beam 130b. The mirror surface 14 is formed on a surface on the −Y side of the mirror portion 120. FIG. 5 illustrates the mirror surface 14 having a rectangular shape in plan view; however, the shape of the mirror surface 14 is not limited thereto and may be another shape, such as a circular shape or an ellipsoidal shape.

The drive beams 130a and 130b are provided to sandwich the mirror portion 120 from both sides in the Y direction, and support the mirror portion 120 swingably around the swing axis E. The drive beams 130a and 130b, by swinging the mirror portion 120, can change the inclination of the mirror surface 14 around the swing axis E.

The drive beam 130a is a meandering beam having a meandering structure (folding structure) including a plurality of beam members 133. One end of the drive beam 130a is coupled to an outer peripheral portion of the mirror portion 120, and the other end of the drive beam 130a is coupled to an inner peripheral portion of the support portion 140a. The plurality of beam members 133 included in the drive beam 130a are respectively provided with piezoelectric drive portions 131a to 131d. The piezoelectric drive portions 131a to 131d each include a piezoelectric element, and deform the drive beam 130a in accordance with a drive voltage that is applied thereto.

The drive beam 130b is a meandering beam having a meandering structure including a plurality of beam members 133. One end of the drive beam 130b is coupled to an outer peripheral portion of the mirror portion 120, and the other end of the drive beam 130b is coupled to an inner peripheral portion of the support portion 140b. The plurality of beam members 133 included in the drive beam 130b are respectively provided with piezoelectric drive portions 132a to 132d. The piezoelectric drive portions 132a to 132d each include a piezoelectric element, and deform the drive beam 130b in accordance with a drive voltage that is applied thereto.

The position at which the drive beam 130a is coupled to the mirror portion 120 and the position at which the drive beam 130b is coupled to the mirror portion 120 are point-symmetrical with respect to the center of the mirror surface 14. The position at which the drive beam 130a is coupled to the support portion 140a and the position at which the drive beam 130b is coupled to the support portion 140b are point-symmetrical with respect to the center of the mirror surface 14. In one example, the positional relationship may be line-symmetrical with respect to a line that is on a plane parallel to the mirror surface 14 and that is perpendicular to the swing axis E (that is, a line parallel to the X-axis).

The support portion 140a supports the drive beam 130a. The support portion 140b supports the drive beam 130b.

The support portion 140b has an electrode coupling portion 150 on a surface on the −Z side of the support portion 140b for receiving input of a drive voltage. The electrode coupling portion 150 includes a positive electrode coupling portion 150a to which a positive voltage is input, a ground (GND) coupling portion 150b coupled to the GND, and a negative electrode coupling portion 150c to which a negative voltage is input.

The positive electrode coupling portion 150a, the GND coupling portion 150b, and the negative electrode coupling portion 150c are a plurality of voltage input portions arranged in the X direction. The direction in which the positive electrode coupling portion 150a, the GND coupling portion 150b, and the negative electrode coupling portion 150c are arranged is in the X direction that is the longitudinal direction of each of the plurality of beam members 133 included in the drive beam 130a or the drive beam 130b.

At least one wiring 123 is provided in a region on the surface on the —Z side of the mirror portion 120 other than the mirror surface 14 and on a surface on the —Z side of each of the drive beams 130a and 130b. When the wiring 123 includes a plurality of wiring, it is desirable to provide the plurality of wiring to surround the mirror surface 14 because an imbalance of weight can be suppressed.

The piezoelectric drive portions 131a to 131d provided on the drive beam 130a are electrically coupled to the electrode coupling portion 150 provided on the support portion 140b by the wiring 123. The wiring 123 conducts a drive voltage input via the electrode coupling portion 150 to each of the piezoelectric drive portions 132a to 132d, passes the drive voltage over the surface of the mirror portion 120, and conducts the drive voltage to each of the piezoelectric drive portions 131a to 131d. The drive voltage input from the electrode coupling portion 150 is applied to both the drive beams 130a and 130b via the wiring 123.

The wiring 123 includes a positive voltage lead wire 123a that conducts a positive voltage, a GND lead wire 123b that is coupled to the GND, and a negative voltage lead wire 123c that conducts a negative voltage. The positive voltage lead wire 123a is coupled to the positive electrode coupling portion 150a, the GND lead wire 123b is coupled to the GND coupling portion 150b, and the negative voltage lead wire 123c is coupled to the negative electrode coupling portion 150c.

The movable member 13 has light passing regions 16 and 17 between the support portion 140a and the support portion 140b, on both sides of the minor portion 120 in the X direction. The light passing regions 16 and 17 are open regions where an obstacle such as a support portion does not exist. The light passing regions 16 and 17 allow the reflected light reflected by the mirror surface 14 to pass therethrough when the mirror portion 120 swings. The light passing regions 16 and 17 each may be a void without a member, or each may include a member that transmits light, such as glass, in at least a portion of the void. In one example, the light passing regions 16 and 17 may have tapered shapes whose widths in a direction along the swing axis E are increased as the widths are farther from the swing axis E.

In the movable member 13, a silicon on insulator (SOI) substrate is shaped by etching, and the minor surface 14, the drive beams 130a and 130b, the electrode coupling portion 150, and so forth are formed on the shaped substrate, thereby integrally forming the components. The components may be formed after the SOI substrate is shaped, or may be formed while the SOI substrate is being shaped.

The movable member 13 includes a plurality of movable portions, such as the mirror portion 120, and the drive beams 130a and 130b, which are integrally formed through a semiconductor process. In one example, the movable member 13 may not be integrally formed, and a plurality of members may be combined to form the movable member 13.

The movable member 13 is not necessarily be formed through the semiconductor process; however, it is more desirable to fabricate the movable member 13 through the semiconductor process because a small movable member 13 can be fabricated, fabrication efficiency increases, and formation precision increases.

The movable member 13 may be referred to as a movable device from the viewpoint of including a plurality of movable portions. In the present embodiment, in particular, the movable direction 10 of the movable member 13 represents a direction in which the mirror portion 120 that swings around the swing axis E is movable.

A region V indicated by a broken-line rectangle in FIG. 5 is described later referring to FIGS. 10 and 11.

Configuration Example of Shock Absorbing Member 2

Figure 6:
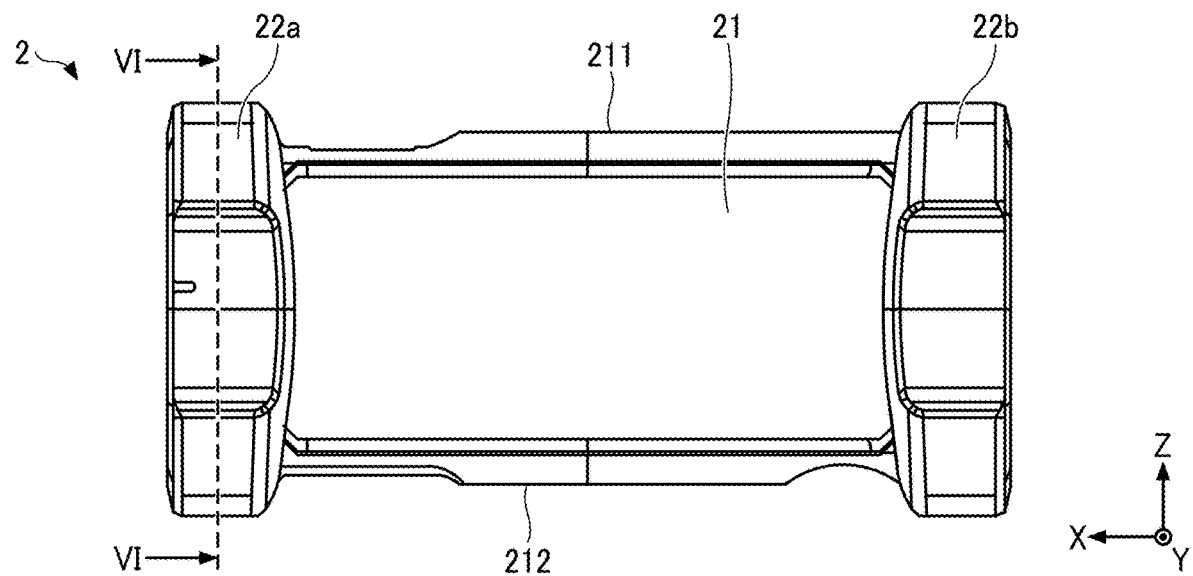
FIG. 6 is a front view illustrating a first example of a configuration of a shock absorbing member in the spectroscope in FIG. 1.
Figure 7:
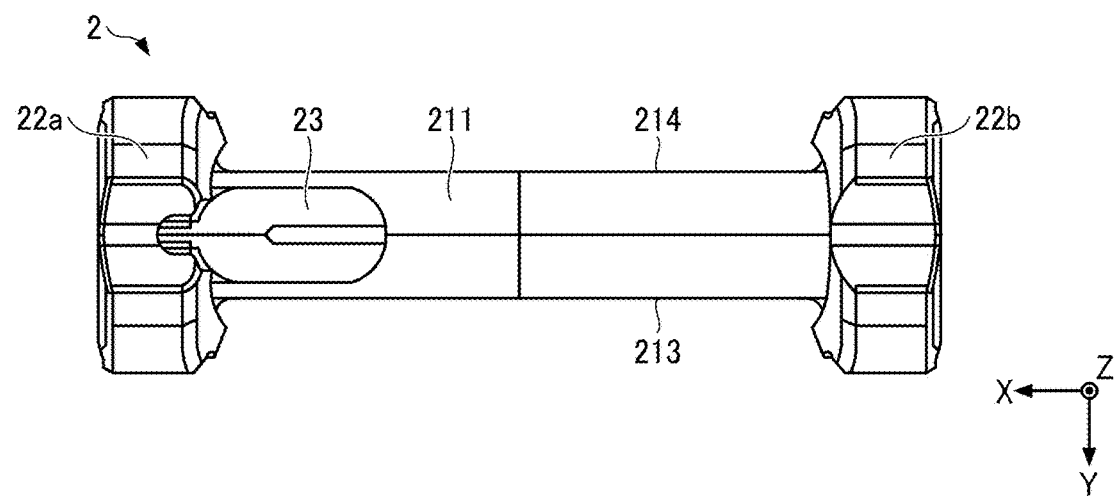
FIG. 7 is a top view illustrating the first example of the configuration of the shock absorbing member in the spectroscope in FIG. 1.

FIGS. 6 to 9 illustrate a first example of a configuration of the shock absorbing member 2 in the spectroscope 100. FIG. 6 is a front view, FIG. 7 is a top view, FIG. 8 is a side view, and FIG. 9 is a cross-sectional view taken through line VI-VI in FIG. 6.

As illustrated in FIGS. 6 to 9, the shock absorbing member 2 has a front opening 21 at the center thereof, and is a member having a substantially rectangular frame shape in view from the front (+Y side). The shock absorbing member 2 is attached to the housing 1 through the front opening 21. The shock absorbing member 2 holds the housing 1 on the inner side of the shock absorbing member 2.

The shock absorbing member 2 has an upper surface 211, a lower surface 212, a front surface 213, and a rear surface 214. The upper surface has an upper opening 23. The upper opening 23 is provided at a position corresponding to the switch 12 in the housing 1, and exposes the switch 12 when the shock absorbing member 2 is attached to the housing 1.

The shock absorbing member 2 is provided with protection portions 22a and 22b at both ends of the shock absorbing member 2 in the longitudinal direction (X direction) of the rectangle in front view of the shock absorbing member 2. The protection portions 22a and 22b are provided to protrude from the upper surface 211 toward the +Z side, from the lower surface 212 toward the −Z side, from the front surface 213 toward the +Y side, and from the rear surface 214 toward the −Y side. For example, when the spectroscope 100 is dropped onto the ground, the protection portions 22a and 22b collide with the ground faster than the upper surface 211, the lower surface 212, the front surface 213, and the rear surface 214.

The protection portions 22a and 22b are provided at substantially symmetrical positions at both ends of the shock absorbing member 2 in the X direction with respect to the center of the front opening 21 and in substantially symmetrical shapes. Since the protection portions 22a and 22b have configurations equivalent to each other except the positions and orientations, the protection portion 22a is representatively described here.

As illustrated in FIGS. 8 and 9, the protection portion 22a has a side opening 24 at the center thereof, and has a substantially rectangular frame shape in view in the +X direction. Four corners on the outer side and four corners on the inner side of the substantially rectangular frame of the protection portion 22a each have a curvature.

The side opening 24 exposes the window 11 when the shock absorbing member 2 is attached to the housing 1. FIGS. 8 and 9 illustrate the movable member 13 disposed inside the housing 1 when the housing 1 is held by the shock absorbing member 2, on the inner side of the side opening 24. The mirror portion 120 of the movable member 13 swings along the movable direction 10.

The protection portion 22a has recesses 25a and 25b provided on both sides of the protection portion 22a in the Y direction.

The protection portion 22a has restricting portions 26 on the inner side of the protection portion 22a, at positions substantially symmetrical with respect to the center of the side opening 24 in substantially symmetrical shapes. The restricting portions 26 restrict the position of the housing 1 in the X direction when the housing 1 is held by the shock absorbing member 2.

The shock absorbing member 2 holds the housing 1 on the inner side of the shock absorbing member 2 and includes depressions 27a and 27b on the outer side of the shock absorbing member 2. The depressions 27a and 27b are depressed in a direction along the movable direction 10 of the movable member 13. The depressions 27a and 27b are provided at both ends of the protection portion 22a in the Z direction, at positions substantially symmetrical with respect to the center of the side opening 24 in substantially symmetrical shapes. Since the depressions 27a and 27b have configurations equivalent to each other except the positions and orientations, the depression 27a will be representatively described here.

The depression 27a includes a bottom 271 and includes a tapered shape that is narrower toward the bottom 271. A depression taper angle θ is a taper angle of the tapered shape of the depression 27a. A thickness h is a thickness (length) along the movable direction 10 from the inner side to the outer side of the protection portion 22a in view in the +X direction. A depth d is a depth (length) along the movable direction 10 from the outer side of the shock absorbing member 2 to the bottom 271 of the depression 27a.

Since the shock absorbing member 2 has the depression 27a, flexible portions 28a and 28b around the depression 27a are likely to be deformed as compared to the protection portion 22a not having the depression 27a. In particular, when a force is applied to the shock absorbing member 2 along the movable direction 10, the flexible portions 28a and 28b are likely to be deformed by being flattened in the movable direction 10. When tip ends (end portions on the +Z side) of the flexible portions 28a and 28b are sharp, the flexible portions 28a and 28b are more likely to be deformed. In this case, the flexible portions 28a and 28b refer to portions of the end portion of the shock absorbing member 2 having the depression 27a other than the depression 27a.

The deeper the depressions 27a and 27b are, the more likely the flexible portions 28a and 28b are to be deformed. In the first example of the present embodiment, the depth d is 5.1 mm. The smaller the depression taper angles of the depressions 27a and 27b, the more likely the flexible portions 28a and 28b are to be deformed. In the first example of the present embodiment, the depression taper angle θ is 120.0 degrees. The thickness h is 11.0 mm.

The depressions 27a and 27b are characteristic components of the shock absorbing member 2 of the spectroscope 100. In contrast, the front opening 21, the protection portions 22a and 22b, the upper opening 23, the side openings 24, the recesses 25a and 25b, and the restricting portions 26 of the shock absorbing member 2 are not characteristic components, and are not necessarily provided.

Figure 10:
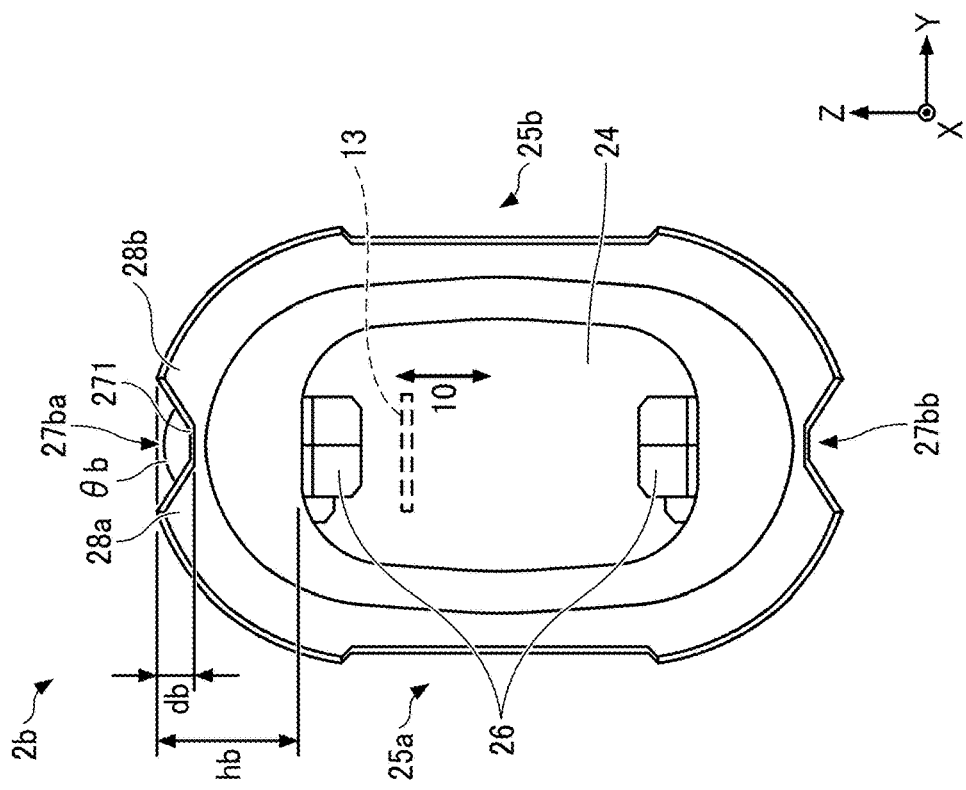
FIG. 10 is a side view illustrating a second example of a shock absorbing member in the spectroscope in FIG. 1.

FIG. 10 is a side view illustrating a shock absorbing member 2a that is a second example of a shock absorbing member in the spectroscope 100. Components identical or equivalent to the components in the first example illustrated in FIG. 8 are denoted by the same reference signs, and the redundant description is appropriately omitted. The same applies to modifications and embodiments described later.

The shock absorbing member 2a has depressions 27aa and 27ab. In each of the depressions 27aa and 27ab, a depth da is 2.0 mm, a depression taper angle θa is 120.0 degrees, and a thickness ha is 11.0 mm.

Figure 11:
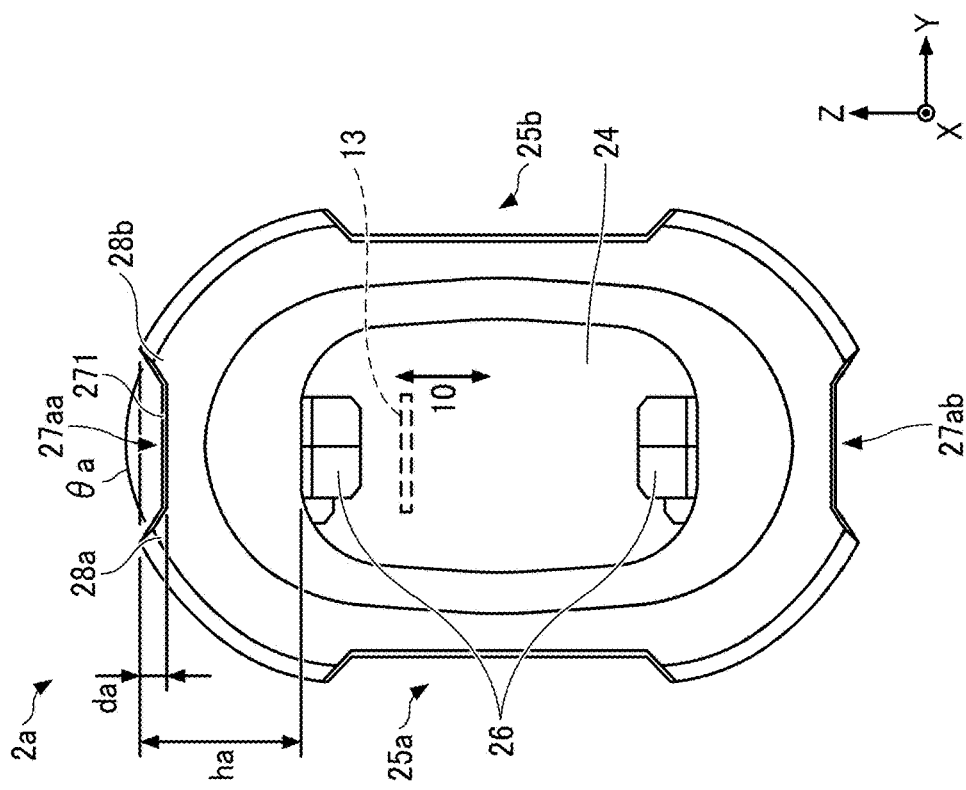
FIG. 11 is a side view illustrating a third example of a shock absorbing member in the spectroscope in FIG. 1.

FIG. 11 is a side view illustrating a shock absorbing member 2b that is a third example of a shock absorbing member in the spectroscope 100.

The shock absorbing member 2b has depressions 27ba and 27bb. In each of the depressions 27ba and 27bb, a depth db is 3.5 mm, a depression taper angle θb is 120.0 degrees, and a thickness hb is 9.5 mm.

Table 1 presents examination results of materials of the shock absorbing member 2. Operability and durability were mainly evaluated, and the evaluation results were indicated by "⊚", "○", "Δ", or "x". "⊚" represents very good, "○" represents fair, "Δ" represents not good depending on the condition, and "x" represents seriously not good. In addition, "–" in Table 1 represents that evaluation has not been made.

TABLE 1

| Classification | Evaluation items | Rubber | | | Gel | | | Sponge | |
| --- | --- | --- | --- | --- | --- | --- | --- | --- | --- |
| | | Silicone | Urethane | EVM | Silicone-base | Urethane-base A | Urethane-base B | PE | Urethane-base B |
| Operability | Texture | ⊚ | ○ | ○ | x | Δ | Δ | Δ | Δ |
| | Grip | ○ | ○ | ○ | Δ | Δ | Δ | x | Δ |
| | Ease of removal | ○ | Δ | Δ | Δ | Δ | Δ | Δ | Δ |
| Durability | Loss of elasticity | ○ | ○ | ○ | ○ | ○ | ○ | x | ○ |
| | Abrasion | Δ | ⊚ | ○ | x | ⊚ | ⊚ | x | ○ |
| | Bleed | Δ | ○ | ○ | x | ○ | ○ | — | ○ |
| | Heat resistance | ⊚ | ○ | ○ | ⊚ | ○ | ○ | — | ○ |
| | Water resistance | ⊚ | Δ | ○ | ○ | Δ | Δ | — | Δ |
| | Oil resistance | Δ | ⊚ | Δ | Δ | ⊚ | ⊚ | — | ○ |
| | Light resistance | Δ | Δ | Δ | — | Δ | Δ | — | Δ |
| Evaluation results | | ⊚ | ○ | Δ | x | ○ | ○ | x | Δ |

As presented in Table 1, it was found that silicone rubber is the most suitable material for the shock absorbing member 2 in terms of operability and durability. Silicone rubber was applied to the materials of the shock absorbing member 2, the shock absorbing member 2a, and the shock absorbing member 2b according to the present embodiment.

Effect of Shock Absorbing Member 2

Figure 12:
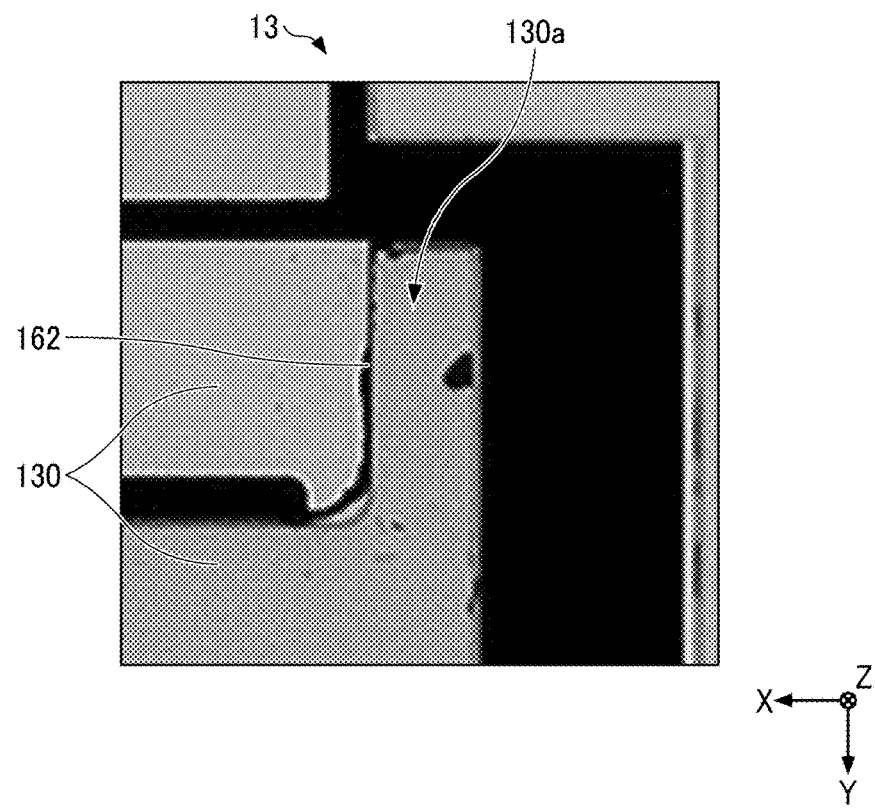
FIG. 12 is an image presenting a movable member broken due to a drop shock.

FIG. 12 is an image presenting the movable member 13 that is broken due to a drop shock, and is an enlarged photograph of a region corresponding to the region V in FIG. 5.

When the spectroscope 100 is dropped or collides with a wall or the like, a shock is applied to the spectroscope 100 and the spectroscope 100 may be broken. For example, as illustrated in FIG. 12, in the meandering structure of the movable member 13, a shear stress corresponding to a shock is likely to be applied to a portion where adjacent beam members 133 are coupled, and the portion is likely to be broken. A crack 162 is a crack that is generated at a coupling portion of the beam member 133 by a shear stress corresponding to a shock.

Also, a portion where the support portion 140a is coupled to the drive beam 130a, a portion where the support portion 140a is coupled to the drive beam 130b, and a portion where the drive beams 130a and 130b are coupled to the mirror portion 120 are likely to receive a shear stress corresponding to a shock and are likely to be broken.

In particular, when a shock is applied along the movable direction 10, a shear stress due to the shock is further added to the shear stress originally applied due to the movement of the movable member 13, and hence the movable member 13 is more likely to be broken. When the movable member 13 is broken, the spectroscope 100 is no longer available.

In the present embodiment, the flexible portions 28a and 28b around the depression 27a of the shock absorbing member 2 are particularly likely to be deformed by a force applied in the movable direction 10, and hence the shock absorbing member 2 can properly absorb the shock applied in the movable direction 10 due to a drop or the like of the spectroscope 100. In the spectroscope 100, since the shock absorbing member 2 absorbs the shock, it is possible to suppress addition of a shear stress to the movable member 13 due to the shock, and hence it is possible to suppress breakage of the movable member 13.

Figure 13:
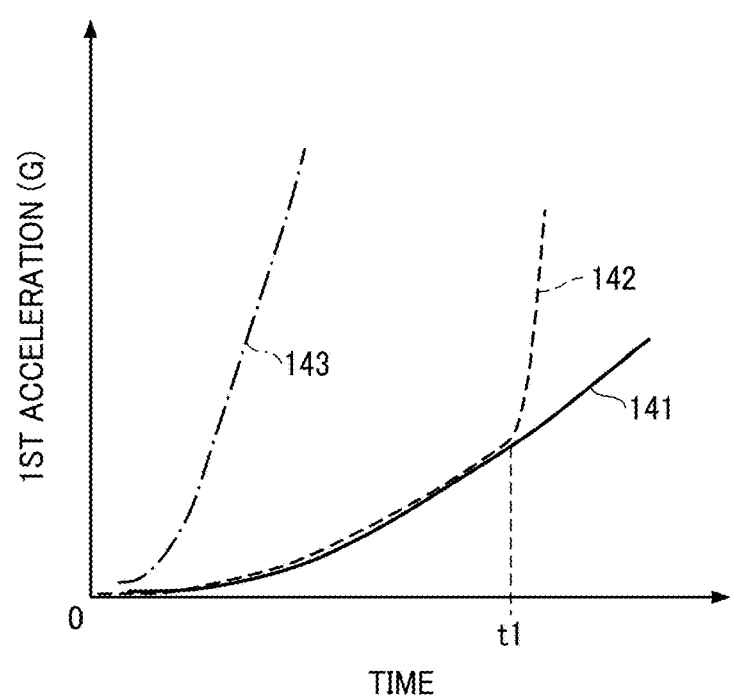
FIG. 13 is a graph presenting measurement results of drop shocks.

FIG. 13 is a graph presenting measurement results of drop shocks. To measure a drop shock, an acceleration sensor was provided at a position near the movable member 13 in the housing 1 of the spectroscope 100, and the spectroscope 100 was dropped onto the floor from above about 60 cm of the floor. The dropped spectroscope 100 was bound on the floor and collided with the floor a plurality of times. A 1st acceleration, which is an acceleration when the dropped spectroscope 100 collides with the floor for the first time among the plurality of collisions, was measured.

In FIG. 13, the horizontal axis indicates time, and the vertical axis indicates the 1st acceleration. The value "0" in time indicates a timing at which the spectroscope 100 collides with the floor for the first time. A solid-line graph 141 is a result of the shock absorbing member 2 according to the first example, and a broken-line graph 142 is a result of the shock absorbing member 2a according to the second example (see FIG. 10). A dotted-chain-line graph 143 is a result of a spectroscope according to a comparative example in which the shock absorbing member 2 including the depressions 27a and 27b is not provided, that is, the embodiment is not applied.

In the graph 143, the 1st acceleration rapidly increased immediately after the spectroscope 100 collided with the floor. In the graph 141, an increase in the 1st acceleration was markedly suppressed compared to the graph 143.

In the graph 142, an increase in the 1st acceleration could be suppressed similarly to the graph 141 until a time t1: however, the 1st acceleration rapidly increased after the time t1 elapsed. The time t1 is a time taken for the bottom 271 of the depression 27aa to come into contact with the floor after the flexible portion 28a or 28b of the shock absorbing member 2a is flattened by a collision with the floor. That is, it takes a certain time until the flexible portion 28a or 28b is completely flattened and the shock is no longer absorbed by the flexible portion 28a or 28b.

Figure 14:
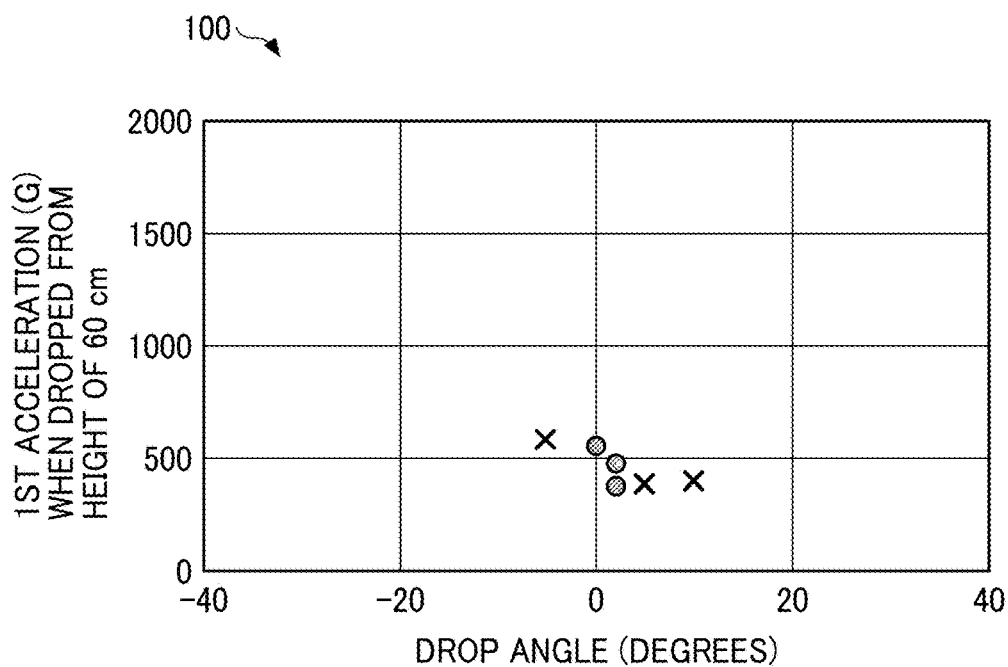
FIG. 14 is a graph presenting measurement results of drop shocks of the spectroscope in FIG. 1.
Figure 15:
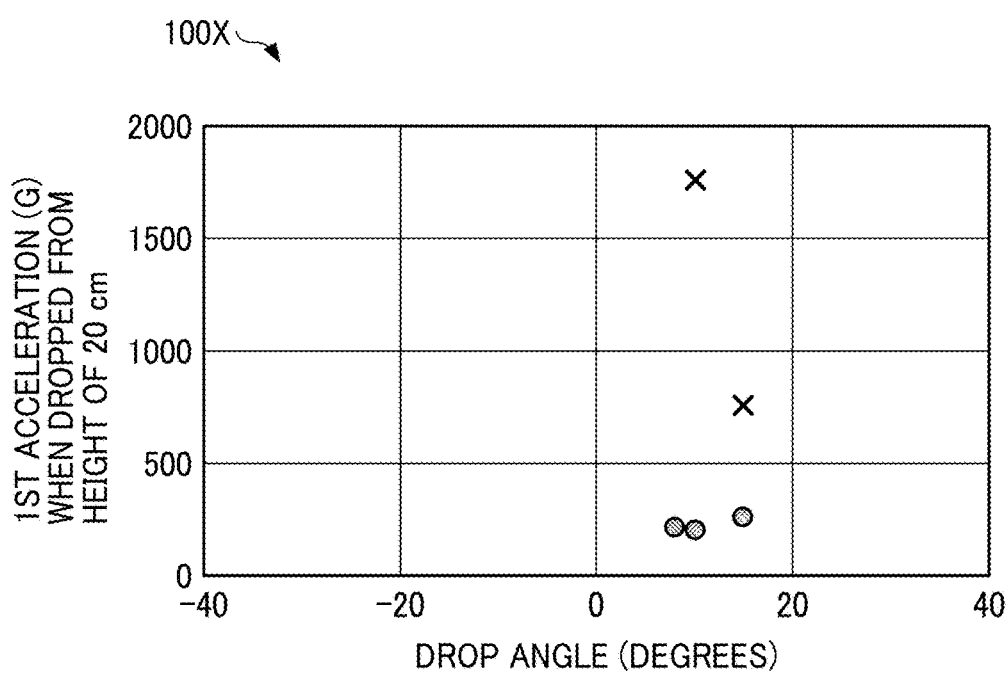
FIG. 15 is a graph presenting measurement results of drop shocks of a spectroscope according to a comparative example.

FIG. 14 is a graph presenting measurement results of drop shocks of the spectroscope 100. FIG. 15 is a graph presenting measurement results of drop shocks of a spectroscope 100X according to a comparative example. The method of measuring a drop shock is similar to that described with reference to FIG. 14.

Figure 16:
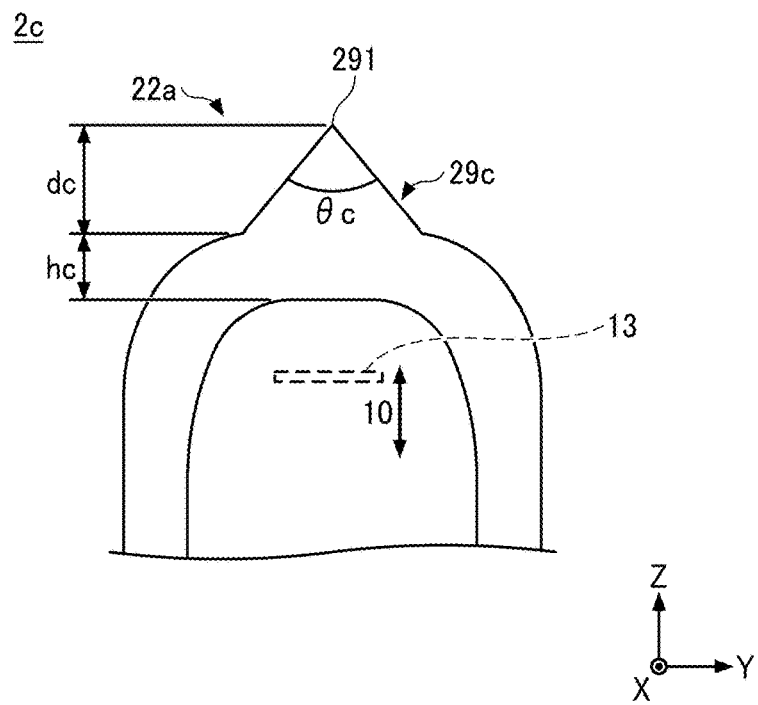
FIG. 16 is a schematic diagram illustrating a fourth example of a shock absorbing member in the spectroscope in FIG. 1.

FIG. 14 illustrates the measurement results of the 1st acceleration when the spectroscope 100 was dropped from a height distant from the floor by 60 cm. In contrast, regarding the spectroscope 100X, when the spectroscope 100X was dropped from a height distant from the floor by 60 cm, the 1st acceleration excessively increased and measurement was no longer available. FIG. 16 illustrates the measurement results of the 1st acceleration when the spectroscope 100X was dropped from a height distant from the floor by 20 cm. The condition of a drop was eased compared to the measurement in FIG. 15.

In FIGS. 14 and 15, the horizontal axis indicates a drop angle. The drop angle represents an angle at which a portion extending along the longitudinal direction of the spectroscope 100 or 100X (the X direction in FIG. 1) is inclined with respect to the floor when the spectroscope 100 or 100X is dropped onto the floor.

In FIGS. 14 and 15, plots with black dots "●" indicate measurement results when a plate made of a lauan material was placed on the floor and the spectroscopes 100 and 100X were dropped onto the plate made of the lauan material. Plots with "x" indicate measurement results when a metal plate was placed on the floor and the spectroscopes 100 and 100X were dropped onto the metal plate.

As illustrated in FIG. 14, regarding the spectroscope 100, the 1st acceleration was about 500.0 G. In contrast, as illustrated in FIG. 15, in spite of the fact that the spectroscope 100X was dropped at a height distant from the floor by 20 cm that is an easier condition than the condition in FIG. 14, the 1st acceleration was about 500.0 G in the case of a drop onto the plate of the lauan material. In the case of a drop onto the metal plate, the 1st acceleration was 700.0 G or 1700.0 G.

Table 2 presents measurement results of drop shocks of the shock absorbing member 2 according to the first example, the shock absorbing member 2a according to the second example, and the shock absorbing member 2b according to the third example. A drop shock F is an average value of results obtained by performing an experiment 20 times of dropping the spectroscope onto the floor and measuring the 1st accelerations 20 times. A variation a is a standard deviation of the results obtained by measuring the 1st accelerations 20 times.

TABLE 2

|  | First example | Second example | Third example |
| --- | --- | --- | --- |
| t [mm] | 11.0 | 11.0 | 9.5 |
| d [mm] | 5.1 | 2.0 | 3.5 |
| θ [degrees] | 120.0 | 120.0 | 120.0 |
| F [G] | 340.0 | 459.0 | 414.0 |
| σ [G] | 87.0 | 160.0 | 121.0 |

As presented in Table 2, it was found that the shock absorbing member 2 among the shock absorbing member 2, the shock absorbing member 2a, and the shock absorbing member 2b has the smallest drop shock F and the smallest variation σ, absorbs the drop shock, and has the highest shock resistance.

As described above, the spectroscope 100 is the electronic device incorporating the movable member 13, and includes the housing 1 that houses the movable member 13 inside the housing 1, and the shock absorbing member 2 that reduces a shock to the movable member 13. The shock absorbing member 2 holds the housing 1 on the inner side of the shock absorbing member 2 and includes the depressions 27a and 27b on the outer side of the shock absorbing member 2. The depressions 27a and 27b are depressed in the direction along the movable direction 10 of the movable member 13.

Since the shock absorbing member 2 has the depression 27a, the flexible portions 28a and 28b around the depression 27a are likely to be deformed as compared to the protection portion 22a not having the depression 27a. In particular, when a force is applied to the shock absorbing member 2 along the movable direction 10, the flexible portions 28a and 28b are likely to be deformed to be flattened along the movable direction 10. Thus, the shock absorbing member 2 can further properly absorb a shock that is applied in the movable direction 10 due to, for example, a drop or the like of the spectroscope 100, and can suppress a shear stress due to the shock from being added to the movable member 13. Accordingly, in the present embodiment, the shock resistance of the spectroscope 100 incorporating the movable member 13 can be increased. Since the shock resistance of the spectroscope 100 is increased, breakage of the movable member 13 can be suppressed.

While the protection portions 22a and 22b each include the depressions 27a and 27b, in the present embodiment, the shock absorbing member 2 may have at least one depression depressed in a direction along the movable direction 10 of the movable member 13. However, to further increase the shock resistance, it is desirable to form a depression depressed in a direction along the movable direction 10 of the movable member 13 at each end portion of the shock absorbing member 2 in the Z direction. In one example, a set of multiple depressions may be provided at each end portion of the shock absorbing member 2.

In the viewpoint of making the flexible portions 28a and 28b be likely to be deformed and further properly absorbing the shock applied in the movable direction 10 due to a drop or the like of the spectroscope 100, the depth d along the movable direction 10 from the outer side of the shock absorbing member 2 to the bottom 271 of the depression is preferably 5.1 mm or more. The depressions 27a and 27b each desirably include a tapered shape that is narrower toward the bottom 271, The tapered shapes of the depressions 27a and 27b each desirably have a depression taper angle θ of 120 degrees or less. It is further desirable that tip ends (end portions on the +Z side) of the flexible portions 28a and 28b are sharp.

It is desirable to form the movable member 13 through a semiconductor process. Fabricating the movable member 13 through the semiconductor process enables fabrication of a small movable member 13, thereby downsizing the spectroscope 100. Moreover, since the fabrication efficiency of the movable member 13 increases, the productivity of the spectroscope 100 can be increased and the cost of the spectroscope 100 can be reduced. Furthermore, since the movable member 13 is formed with higher precision, the yield of the spectroscope 100 can be increased, the productivity of the spectroscope 100 can be increased, and the cost of the spectroscope 100 can be reduced.

The shock absorbing member 2 desirably includes silicone rubber. Since the shock absorbing member 2 includes silicone rubber, the shock absorbing member 2 can be improved in operability and durability as presented in Table 1.

Advantageous effects of the frame 209 are described here. In the present embodiment, straight portions connecting adjacent vertices of a polygon are continuously coupled in the frame 209 of the spectroscope 100. In other words, the respective surfaces of the frame 209 to which the concave diffraction grating 202 and the movable member 13 are secured are integrally formed. Accordingly, deformation of the frame 209 can be suppressed.

In the present embodiment, in the spectroscope 100, the movable member 13, the concave diffraction grating 202, and so forth are secured to a surface on the outer side of the frame 209. Thus, a device such as a chip mounter that is used for surface mounting of an electronic component onto a printed circuit board can be used for mounting of the concave diffraction grating 202, the movable member 13, and so forth. Using the device such as a chip mounter can align the movable member 13, the concave diffraction grating 202, and so forth with high precision. In addition, an individual difference can be suppressed for each spectroscope 100 to be fabricated. It is desirable to provide an inclination correction mechanism, such as an abutting portion or an alignment mark, on each of the surfaces on the outer side of the frame 209 to suppress disposition of the movable member 13, the concave diffraction grating 202, and so forth, in an inclined manner during mounting.

Moreover, in the present embodiment, the concave diffraction grating 202, the movable member 13, and so forth are directly mounted on the frame 209 without being mounted on a primary mounting board (carrier member) such as a printed circuit board. Thus, interference between primary mounting boards, which limits disposition of optical elements in close proximity to each other and downsizing of the spectroscope, can be avoided.

As a comparative example of the present embodiment, for example, when a frame is disposed such that primary mounting boards with a concave diffraction grating, a movable device, and so forth mounted define the frame to form a spectroscope, it is difficult to precisely dispose the primary mounting boards. Moreover, since the separate boards are combined, the rigidity decreases, deformation or the like occurs, and the stability of the spectroscope is deteriorated. In contrast, according to the present embodiment, the concave diffraction grating 202, the movable member 13, and so forth can be mounted on the frame 209 in close proximity to each other with high precision, thereby increasing the precision of the spectroscope 100. Moreover, the rigidity of the spectroscope 100 can be increased, and the spectroscope 100 can be stabilized.

Modifications of First Embodiment

Modification of Shock Absorbing Member

While the shock absorbing member 2 including the depressions 27a and 27b on the outer side of the shock absorbing member 2 is exemplarily described in the first embodiment, the shock absorbing member 2 may include a protrusion on the outer side of the shock absorbing member 2. The protrusion protrudes in a direction along the movable direction 10 of the movable member 13.

Figure 17:
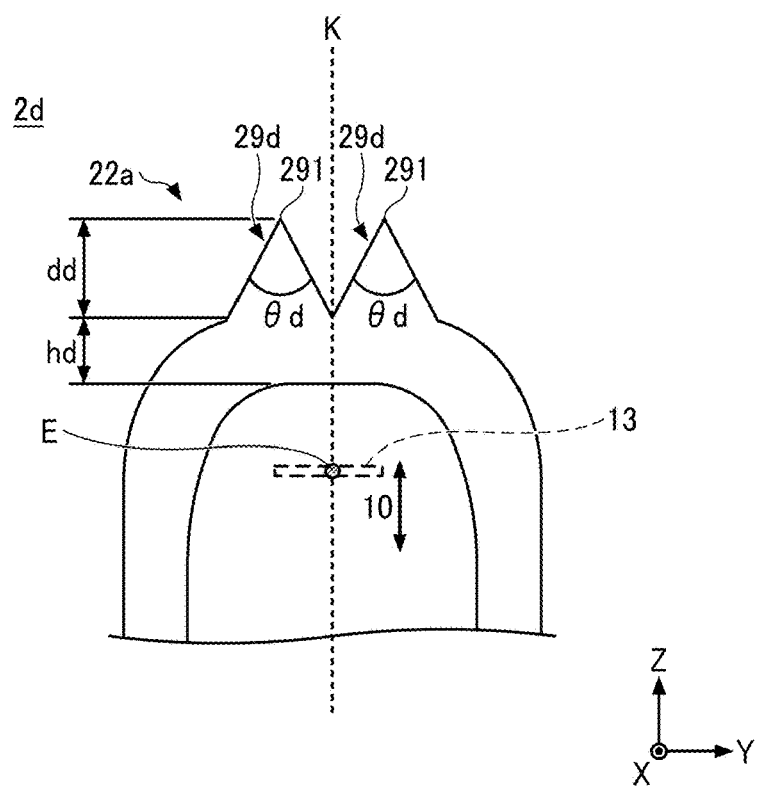
FIG. 17 is a schematic diagram illustrating a fifth example of a shock absorbing member in the spectroscope in FIG. 1.

FIG. 16 is a diagram illustrating a configuration of a shock absorbing member 2c that is a fourth example of a shock absorbing member in the spectroscope 100. FIG. 17 is a diagram illustrating a configuration of a shock absorbing member 2d that is a fifth example of a shock absorbing member in the spectroscope 100. The shock absorbing members 2c and 2d each include a protection portion 22a. FIGS. 16 and 17 schematically illustrate an end portion on the +Z side of the protection portion 22a in view from the +X direction.

As illustrated in FIG. 16, the shock absorbing member 2c holds the housing 1 on the inner side of the shock absorbing member 2c and includes a protrusion 29c on the outer side of the shock absorbing member 2c. The protrusion 29c protrudes in a direction along the movable direction 10 of the movable member 13.

The protrusion 29c includes a tapered shape that is narrower toward an end portion 291 of the protrusion 29c. A protrusion taper angle θc is a taper angle of the tapered shape of the protrusion 29c. A thickness hc is a thickness (length) along the movable direction 10 from the inner side to the outer side of the protection portion 22a of the shock absorbing member 2c in view in the +X direction. A depth dc is a height (length) along the movable direction 10 from the outer side of the shock absorbing member 2c to the end portion 291 of the protrusion 29c.

Since the shock absorbing member 2c has the protrusion 29c, the protrusion 29c is likely to be deformed as compared to the protection portion 22a not having the protrusion 29c. In particular, when a force is applied to the shock absorbing member 2c along the movable direction 10, the protrusion 29c is likely to be deformed to be flattened along the movable direction 10. When a tip end (an end portion on the +Z side) of the protrusion 29c is sharp, the protrusion 29c is further likely to be deformed.

The shock absorbing member 2c can further properly absorb a shock that is applied in the movable direction 10 due to, for example, a drop of the spectroscope 100, and can suppress addition of a shear stress due to the shock to the movable member 13. Thus, the shock absorbing member 2c can increase the shock resistance of the spectroscope 100 incorporating the movable member 13.

As illustrated in FIG. 17, the shock absorbing member 2d holds the housing 1 on the inner side of the shock absorbing member 2d and includes a protrusion 29d on the outer side of the shock absorbing member 2d. The protrusion 29d protrudes in a direction along the movable direction 10 of the movable member 13. The protrusion 29d includes two protrusions disposed at positions symmetrical with respect to an axis K that is substantially orthogonal to the swing axis E and extending along the movable direction 10. Two protrusions have substantially the same shape.

Each of the two protrusions of the protrusion 29d includes a tapered shape that is thinner toward an end portion of the protrusion 29d. A protrusion taper angle θd is a taper angle of each of the tapered shapes of the two protrusions of the protrusion 29d. A thickness hd is a thickness (length) along the movable direction 10 from the inner side to the outer side of the protection portion 22a of the shock absorbing member 2d in view in the +X direction. A depth dd is a height (length) along the movable direction 10 from the outer side of the shock absorbing member 2d to an end portion 291 of each of the two protrusions of the protrusion 29d.

Since the shock absorbing member 2d has the protrusion 29d, the shock absorbing member 2d is likely to be deformed as compared to the protection portion 22a not having the protrusion 29d. In particular, when a force is applied to the shock absorbing member 2d along the movable direction 10, the protrusion 29d is likely to be deformed to be flattened along the movable direction 10. When a tip end (an end portion on the +Z side) of the protrusion 29d is sharp, the protrusion 29d is further likely to be deformed.

The shock absorbing member 2d can further properly absorb a shock that is applied in the movable direction 10 due to, for example, a drop of the spectroscope 100, and can suppress addition of a shear stress due to the shock to the movable member 13. Thus, the shock absorbing member 2d can increase the shock resistance of the spectroscope 100 incorporating the movable member 13.

When colliding with a floor or a wall, the spectroscope 100 may be bound, collide with the floor or the wall a plurality of times, and a shock may be repeatedly applied. In contrast, since the protrusion 29d includes the two protrusions disposed at the positions symmetrical with respect to the axis K, the balance of the spectroscope 100 can be easily maintained when the spectroscope 100 collides with the floor or the wall. Consequently, the spectroscope 100 is not bound and does not collide with the floor or wall a plurality of times, repeated application of a shock to the spectroscope 100 can be suppressed, and breakage of the spectroscope 100 can be suppressed.

From the viewpoint of making the protrusion 29c or the protrusion 29d be easily deformable and more properly absorbing the shock that is applied in the movable direction 10 due to a drop of the spectroscope 100, the height dc of the protrusion 29c and the height dd of the protrusion 29d are each preferably 5.1 mm or more. Each of the protrusion 29c and the protrusion 29d desirably includes a tapered shape that is thinner toward the end portion 291. In one example, the protrusion taper angle θc at the protrusion 29c and the protrusion taper angle θd at the protrusion 29d are each desirably 120 degrees or less. It is further desirable that the tip end of the protrusion 29c or 29d is sharp.

The shock absorbing member 2 may include both a depression and a protrusion. In other words, the shock absorbing member 2 holds the housing t on the inner side of the shock absorbing member 2, and can include at least one of a protrusion protruding in a direction along the movable direction 10 of the movable member 13 or a depression recessed in a direction along the movable direction 10 on the outer side of the shock absorbing member 2.

Modification of Movable Device

Figure 18:
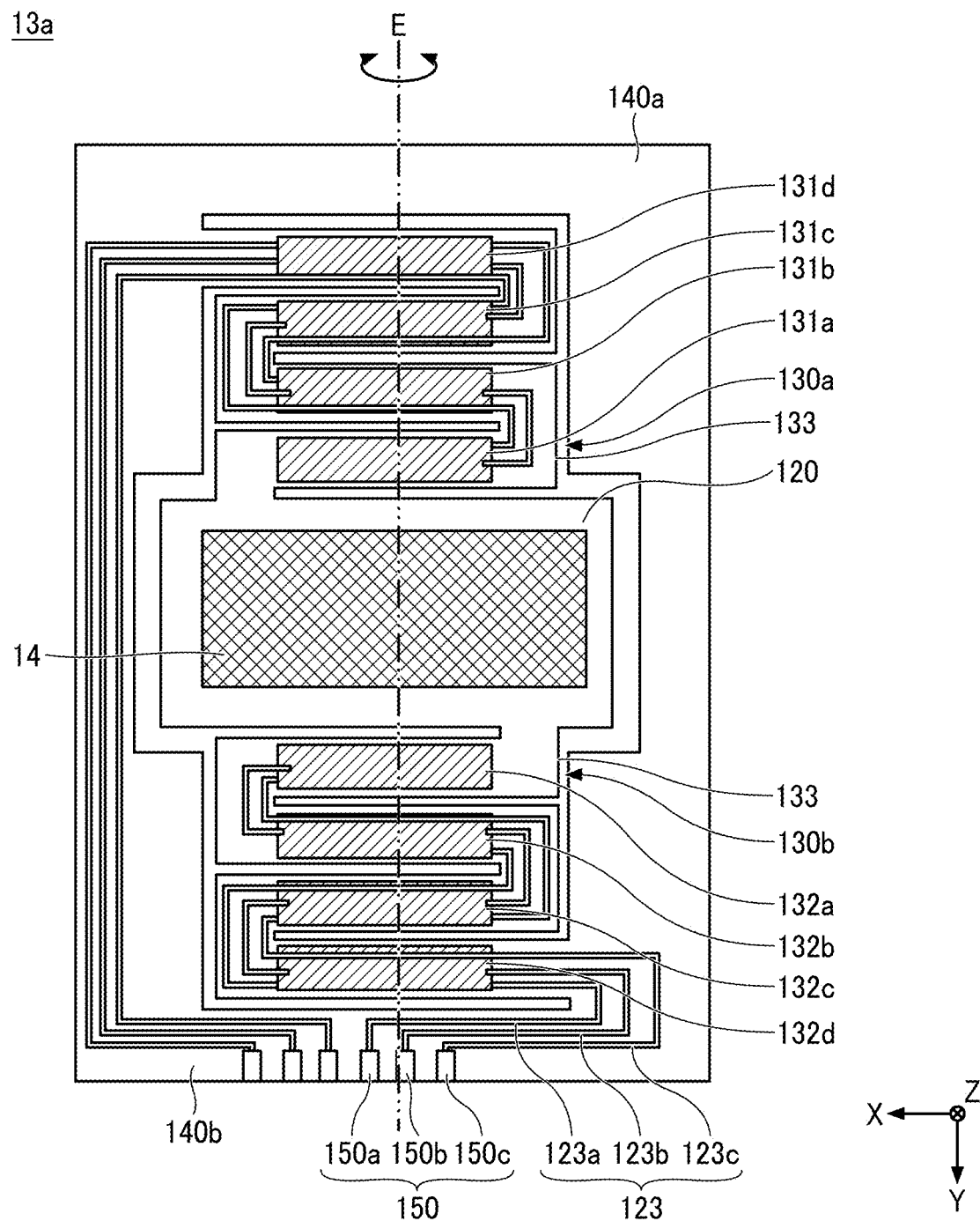
FIG. 18 is a view illustrating a modification of a movable member in the spectroscope in FIG. 1.

FIG. 18 is a plan view illustrating a movable member 13a that is a modification of the movable member 13 of the spectroscope 100. In the movable member 13a, the support portion 140a and the support portion 140b are integrated, and the support portions 140a and 140b have a frame shape that surrounds a mirror portion 120.

When the light deflected by swinging of the mirror portion 120 is not blocked by the support portions 140a and 140b, or when the influence of the blocking of light is negligible, the support portions 140a and 140b can be integrally formed in a frame shape.

Since the support portions 140a and 140b are formed in the frame shapes, there are advantages that a handling operation after the semiconductor wafer is divided into individual pieces can be easily performed, and an operation of bonding the support portions 140a and 140b to a mount or the like can be easily performed.

Modification of Spectroscope

Figure 19:
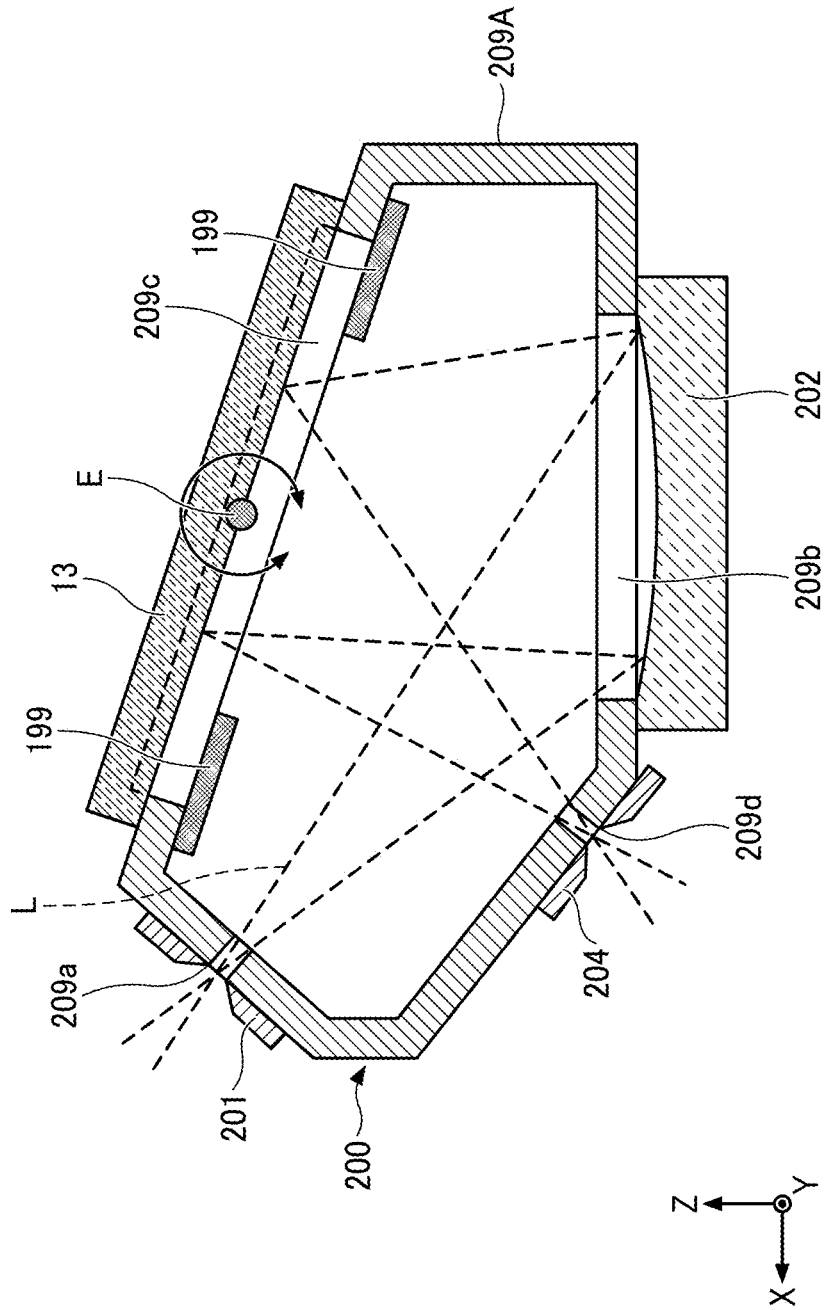
FIG. 19 is a view illustrating a modification of a frame in the spectroscope in FIG. 1.

FIG. 19 is a diagram illustrating a frame 209A that is a modification of the frame 209 of the spectroscope 100. The frame 209A has an upper restriction member 199 at a portion facing the movable member 13 on the inner side of the frame 209A.

The upper restriction member 199 is formed in a shape that does not block a ray L. The upper restriction member 199 has a light transmissive portion smaller than an opening 209c, and is bonded to the inner side of the frame 209A with an adhesive member or the like. The upper restriction member 199 is formed in, for example, a frame shape that surrounds the opening 209c; however, the shape of the upper restriction member 199 is not limited to the frame shape, and may be a shape that covers the drive beams 130a and 130b of the movable member 13.

The mirror portion 120 of the movable member 13 swings around the swing axis E; however, the mirror portion 120 swings in a region of the thickness of the frame 209A, and hence the mirror portion 120 does not come into contact with the upper restriction member 199 during the swing.

In the frame 209A, the opening 209a is formed so that the incidence slit 201 is disposed on the Rowland circle. The opening 209b is formed so that the concave surface of the concave diffraction grating 202 forms a portion of the circumference of the Rowland circle. Thus, the positions and inclinations of the incidence slit 201, the concave diffraction grating 202, and so forth, which are secured to the frame 209A, can be easily adjusted.

Second Embodiment

A spectroscopic system 300 according to a second embodiment is described.

In this case, used home electrical appliances, such as an air conditioner, a television receiver, a refrigerator, a freezer, a washing machine, and a clothes dryer, are recycled. Used home electrical appliances are crushed into small pieces in a home electrical appliance recycling plant, then are sorted and recovered for each material type using magnetism, wind power, vibration, or the like, and are recycled as resources for recycled materials.

Examples of a resin material include general-purpose resins mainly, and resins such as polyethylene (PE), polypropylene (PP), polyvinyl chloride (PVC), polystyrene (PS), polyethylene terephthalate (PET), acrylonitrile butadiene styrene copolymer synthetic resin (ABS), and polycarbonate (PC). A mixture of PC and PS or a mixture of PC and ABS is also typical, and is sorted and recovered for each type of resin by a sorting device using an absorption characteristic in a near infrared region (a wavelength range from 1 to 3 µm) based on a molecular structure of a resin. Also for such a sorting device, a configuration using a movable member such as a MEMS device is known.

The spectroscopic system 300 selects and displays one spectrum waveform by the function of a hand-held device 310, and can be used when the composition of an unknown sample is simply figured out in a non-destructive manner.

Configuration Example of Spectroscopic System 300

Figure 20:
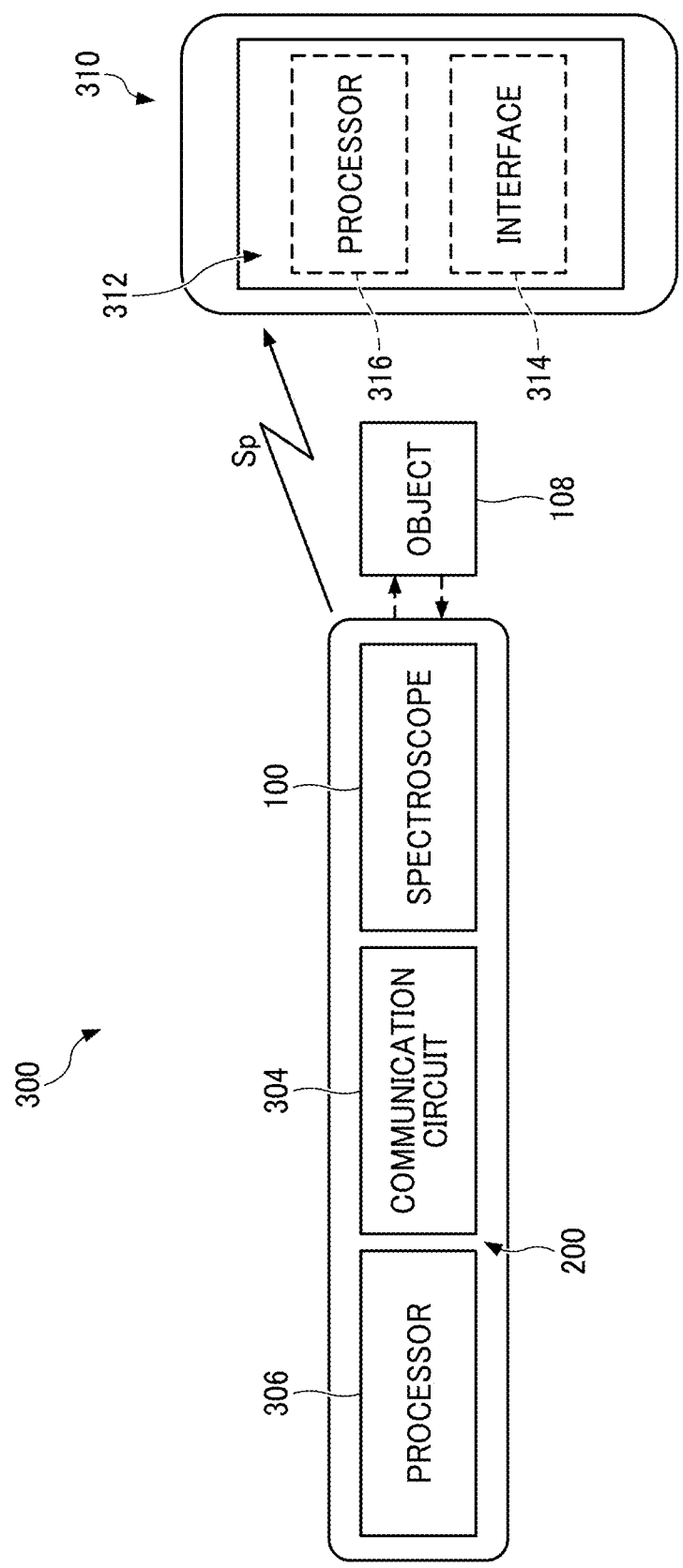
FIG. 20 is a diagram illustrating a general arrangement of a spectroscopic system according to a second embodiment.

FIG. 20 is a diagram illustrating a general arrangement of the spectroscopic system 300. As illustrated in FIG. 20, the spectroscopic system 300 includes a spectroscopic unit 250 and the hand-held device 310.

The spectroscopic unit 250 includes the spectroscope 100 including the movable member 13, a processor 306, and a communication circuit 304.

The spectroscopic system 300 may have a configuration in which one spectroscope 100 is provided for one hand-held device 310, or a configuration in which a plurality of spectroscopes 100 are provided for one hand-held device 310.

The processor 306 receives input of an electric signal that is output from the light receiver 217, from the spectroscope 100, and acquires information in which a time of an optical spectrum is associated with output including a light intensity by computation.

The communication circuit 304 outputs the result obtained by the processor 306 to the hand-held device 310.

The hand-held device 310 includes an interface 314 and a processor 316. The hand-held device 310 is, for example, a portable device, such as a mobile phone or a smartphone. The hand-held device 310 may have a camera function.

The processor 316 converts the time into the wavelength of light based on the information which is output from the processor 306 of the spectroscopic unit 250 and in which the time of the optical spectrum is associated with the output including the light intensity, and based on the vibration frequency of the movable member 13 included in the spectroscope 100, to obtain spectroscopic spectrum information Sp configured in relation to the light intensity for each wavelength of light. The processor 316 acquires information on the optical spectrum reflected by an object 108 and acquired by the spectroscope 100 and an analysis result, such as a composition determination result of the object 108, by computation.

The processor 316 can display the analysis result on a display 312 via the interface 314.

In the spectroscopic system 300, the spectroscope 100 transmits data to the hand-held device 310 via the communication circuit 304 using, for example, wireless serial communication such as Bluetooth. The hand-held device 310 receives data from the spectroscope 100 and processes and analyzes the data using the processor 316. The spectroscopic system 300 causes the display 312 to display, for example, information on the optical spectrum and the composition determination result, which are the analysis result.

Operation Example of Spectroscopic System 300

FIG. 21 is a flowchart presenting a resin determination operation in the spectroscopic system 300.

In step S1, the spectroscopic system 300 provides a plurality of unknown objects 108 whose types of resins to be classified or identified are unknown, for example, in a recycle operation.

In step S2, the spectroscopic system 300 stores one or more infrared material classification models (multivariate classification models) in a memory.

In step S3, the spectroscopic system 300 executes spectroscopic analysis on the object 108 to collect raw infrared spectrum data.

In step S4, the spectroscopic system 300 executes multivariate processing on the raw infrared spectrum data using the processor 316 of the hand-held device 310.

In step S5, the spectroscopic system 300 uses the processor 316 of the hand-held device 310 to identify the composition of a sample as a resin-based composite material of a specific type (corresponding to the material model).

In step S6, the spectroscopic system 300 further processes the object 108 (for example, stores the object 108 in a proper location for a further recycle step). The spectroscopic system 300 can repeat each process from step S1 to step S6 for an object 108 including another resin in step S3.

For example, the spectroscopic system 300 uses a classification model to identify the composition of the object 108 including a resin, and determines a resin that a sample including a specific resin may include. For example, by determining a resin using the spectroscopic system 300, processing conditions of a process such as optimizing processing conditions of a furnace used for material processing can be optimized in the recycle of the object 108 including the resin.

In one exemplary method, a resin-based composite material includes carbon fibers (for example, carbon fiber reinforced plastics, CRFP) obtained by burning (sintering) a resin and regenerating carbon fibers for reuse according to a known method. A proper sintering temperature can be determined in accordance with the type of resin included in the composite material.

As described above, the spectroscopic system 300 can determine a resin with high reliability.

Although the desirable embodiments have been described in detail, the present disclosure is not limited to the above-described embodiments, and various modifications and substitutions can be made without departing from the scope of the present disclosure as set forth in the appended claims.

While the shock absorbing member 2 having the protrusion or the depression on the outer side at the position at which the shock absorbing member 2 covers the end portion of the housing 1 has been illustrated in the embodiment, the configuration of the shock absorbing member 2 is not limited to this configuration. As long as the protrusion or the depression is provided along the movable direction 10 of the movable member 13, the position of the protrusion or the depression in the shock absorbing member 2 is not particularly limited.

While the spectroscope 100 is illustrated in the embodiment, an electronic device having a movable member is not limited to the spectroscope 100. For example, the electronic device may be a projector or the like including a shock absorbing member and a movable member such as a digital mirror device (DMD). The movable member 13 is not limited to the MEMS mirror, and may be any member as long as the member is movable.

The electronic device to which the embodiment is applied is not limited to a portable handy electronic device; however, a handy electronic device is likely to receive a shock when being dropped or colliding with a wall or the like while being carried. Thus, the embodiment is more effectively applied to a handy electronic device.

Numerals such as ordinal numbers and numerical values used in the description of the embodiments are examples for specifically describing the technology of the present disclosure, and the present disclosure is not limited to the exemplified numerals. The coupling relationship between the components is an example for specifically describing the technology of the present disclosure, and the coupling relationship that implements the functions of the present disclosure is not limited thereto.

The invention claimed is:

1. An electronic device comprising:
a housing that houses a movable structure inside the housing, wherein the movable structure is to swing around a predetermined swing axis; and
a shock absorbing structure to reduce a shock to the movable structure;
wherein the shock absorbing structure holds the housing on an inner side of the shock absorbing structure,
the shock absorbing structure includes a protrusion protruding in a direction along a movable direction of the movable structure and a depression depressed in a direction along the movable direction on an outer side of the shock absorbing structure, and
the movable direction is a normal direction of the movable structure when the movable structure is at one position among a range of positions of the movable structure that swings.

2. The electronic device according to claim 1, wherein a depth along the movable direction from an outer side of the shock absorbing structure to a bottom of the depression is 5.1 mm or more.

3. The electronic device according to claim 1, wherein the depression includes a tapered shape that is narrower toward a bottom of the depression.

4. The electronic device according to claim 3, wherein a depression taper angle of the tapered shape of the depression is 120 degrees or less.

5. The electronic device according to claim 1, wherein a height along the movable direction from the outer side of the shock absorbing structure to an end portion of the protrusion is 5.1 mm or more.

6. The electronic device according to claim 1, wherein the protrusion includes a tapered shape that is thinner toward an end portion of the protrusion.

7. The electronic device according to claim 6, wherein a protrusion taper angle of the tapered shape of the protrusion is 120 degrees or less.

8. The electronic device according to claim 1, wherein the protrusion includes a plurality of protrusions disposed at positions symmetrical with respect to an axis intersecting with the swing axis and extending along the movable direction.

9. The electronic device according to claim 1, wherein the movable structure is formed through a semiconductor process.

10. The electronic device according to claim 1, wherein the shock absorbing structure includes silicone rubber.

11. The electronic device according to claim 1, the electronic device being configured to spectroscopically analyze light from an object, the electronic device further comprising, inside the electronic device:
a light source to emit light to the object;
a diffraction structure to diffract light emitted from the light source and reflected by the object; and
a light receiver to output an electric signal corresponding to a light intensity of light diffracted by the diffraction structure,
wherein the movable structure guides the light diffracted by the diffraction structure to the light receiver.

12. The electronic device according to claim 11, wherein the diffraction structure is a concave diffraction grating, and the light receiver is a photoelectric conversion element.

* * * * *